US009228825B2

(12) United States Patent
Takaura et al.

(10) Patent No.: US 9,228,825 B2
(45) Date of Patent: Jan. 5, 2016

(54) POSITIONAL CHANGE MEASUREMENT DEVICE, POSITIONAL CHANGE MEASUREMENT METHOD, AND IMAGE FORMING APPARATUS

(71) Applicants: Atsushi Takaura, Machida (JP); Koji Masuda, Yokohama (JP); Yasuhiro Nihei, Yokohama (JP); Takeshi Ueda, Minato-ku (JP); Koichi Kudo, Yokohama (JP); Taku Amada, Yamato (JP); Kenichi Shimizu, Atsugi (JP); Asato Tamura, Kawasaki (JP)

(72) Inventors: Atsushi Takaura, Machida (JP); Koji Masuda, Yokohama (JP); Yasuhiro Nihei, Yokohama (JP); Takeshi Ueda, Minato-ku (JP); Koichi Kudo, Yokohama (JP); Taku Amada, Yamato (JP); Kenichi Shimizu, Atsugi (JP); Asato Tamura, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/208,621

(22) Filed: Mar. 13, 2014

(65) Prior Publication Data

US 2014/0268180 A1   Sep. 18, 2014

(30) Foreign Application Priority Data

Mar. 15, 2013 (JP) .................................. 2013-054129
Mar. 15, 2013 (JP) .................................. 2013-054266
Jul. 17, 2013 (JP) .................................. 2013-148657
Sep. 12, 2013 (JP) .................................. 2013-189389

(51) Int. Cl.
*G01B 11/14* (2006.01)
*G01B 11/04* (2006.01)
*G03G 15/00* (2006.01)

(52) U.S. Cl.
CPC .............. *G01B 11/043* (2013.01); *G03G 15/00* (2013.01)

(58) Field of Classification Search
USPC .................................................. 356/601–625
See application file for complete search history.

(56) References Cited

U.S. PATENT DOCUMENTS

2005/0012798 A1*  1/2005  Adachi et al. ................. 347/100
2005/0035947 A1*  2/2005  Lutian ........................... 345/166

(Continued)

FOREIGN PATENT DOCUMENTS

JP    2003-267591    9/2003
JP    2009-15240     1/2009
JP    2010-55064     3/2010

OTHER PUBLICATIONS

"Statistical Properties of Dynamic Laser Speckle and Its Applications to Velocity Measurement" Nobuaki Takai, et al., (1980) in *Laser Study*, vol. 8(2), p. 37-p. 45.

*Primary Examiner* — Sang Nguyen
(74) *Attorney, Agent, or Firm* — Oblon, McClelland, Maier & Neustadt, L.L.P.

(57) ABSTRACT

An objective is to achieve a positional change measurement device which measures positional change of a dynamic measured surface by using speckle patterns while easily reducing influence of fluctuations in a measurement environment temperature. Provided is a positional change measurement device including: a light source; an illuminating optical system configured to guide light from the light source to a measured surface; an imaging optical system; an image pickup device configured to acquire a speckle pattern by receiving reflection light from the measured surface via the imaging optical system; and detected-length compensation means for compensating for fluctuations in a detected length caused by temperature fluctuations. Positional change of the measured surface is measured based on a result of cross-correlation computation performed on multiple speckle patterns acquired at predetermined time intervals.

19 Claims, 23 Drawing Sheets

(56) References Cited

U.S. PATENT DOCUMENTS

| | | |
|---|---|---|
| 2007/0146729 A1* | 6/2007 | Emtman et al. ............... 356/614 |
| 2009/0238590 A1 | 9/2009 | Masuda |
| 2010/0008686 A1 | 1/2010 | Masuda et al. |
| 2010/0266302 A1 | 10/2010 | Suzuki et al. |
| 2010/0310284 A1* | 12/2010 | Funato et al. ................. 399/302 |
| 2011/0043810 A1 | 2/2011 | Suzuki et al. |
| 2011/0044713 A1 | 2/2011 | Masuda et al. |
| 2011/0102806 A1* | 5/2011 | Meldahl et al. ............... 356/511 |
| 2011/0123237 A1 | 5/2011 | Kudo et al. |
| 2011/0170152 A1 | 7/2011 | Nihei |
| 2011/0234803 A1* | 9/2011 | Nakajima et al. ............. 348/148 |
| 2012/0013885 A1* | 1/2012 | Yang et al. ................... 356/4.01 |
| 2012/0268750 A1 | 10/2012 | Masuda |
| 2013/0216267 A1 | 8/2013 | Masuda et al. |
| 2013/0243446 A1 | 9/2013 | Masuda |
| 2013/0243458 A1 | 9/2013 | Suzuki et al. |
| 2013/0251389 A1 | 9/2013 | Suzuki et al. |
| 2013/0308966 A1 | 11/2013 | Masuda et al. |
| 2014/0044460 A1 | 2/2014 | Kudo et al. |

\* cited by examiner

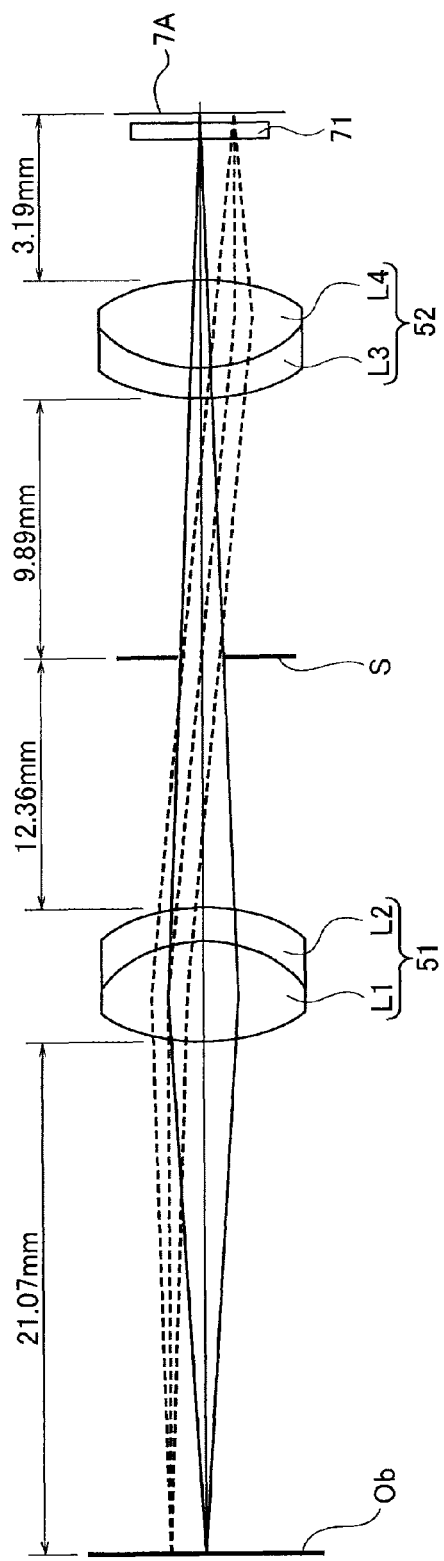

POSITIONAL CHANGE MEASUREMENT DEVICE, POSITIONAL CHANGE MEASUREMENT METHOD, AND IMAGE FORMING APPARATUS

CROSS-REFERENCE TO RELATED APPLICATION

This application claims priority from each of Japanese Patent Application Nos. 2013-054129 filed on Mar. 15, 2013, 2013-054266 filed on Mar. 15, 2013, 2013-148657 filed on Jul. 17, 2013, and 2013-189389 filed on Sep. 12, 2013, the disclosure of which is herein incorporated by reference.

BACKGROUND OF THE INVENTION

1. Field of the Invention

The present invention relates to a positional change measurement device, a positional change measurement method, and an image forming apparatus.

2. Description of the Related Art

Measurement of the traveling velocity or traveled distance of a surface of a belt or the like moving rotationally is performed in various techniques.

For example, a so-called tandem system has become the mainstream system employed by a color image forming apparatus using an electrophotographic process, in order to meet demands for high-speed image formation.

In a color image forming apparatus using the tandem system, four photosensitive bodies are arranged in parallel, the photosensitive bodies corresponding to toner of respective four colors (black, cyan, magenta, and yellow).

Then, toner images of the respective colors are formed on the photosensitive bodies and finally superimposed on one another on a recording medium such as a sheet of paper (a standard-sized sheet, a postcard, a cardboard, an OHP sheet, or the like) to obtain a color image.

There are two methods used in this event: a direct transfer method in which the toner images of the respective colors are superimposed directly on the recording medium, and an intermediate transfer belt method.

In the intermediate transfer belt method, the toner images of the respective colors on the photosensitive bodies are superimposed on and transferred to an intermediate transfer belt to form a color image, and collectively transferred to a recording medium.

In such a transfer, color misalignment occurs unless a conveyer belt for conveying the recording medium in the case of the direct transfer method or the intermediate transfer belt in the case of the intermediate transfer belt method is moved with high accuracy.

Meanwhile, inkjet is known as a type of a color image forming apparatus. The inkjet-type color image forming apparatus obtains a color image by combining ink images of multiple colors and forms the color image on a recording medium such as paper moving in a certain direction.

Such an inkjet-type color image forming apparatus also suffers from color misalignment unless the movement of the recording medium is controlled with high accuracy.

Thus, also in the image forming apparatus, the traveled distance or traveling velocity of the recording medium, the conveyer belt, or the intermediate transfer belt needs to be measured with high accuracy in order to control the movement thereof accurately.

It has been proposed to use speckle patterns for control of driving of a recording medium, a conveyer belt, an intermediate transfer belt, or photosensitive bodies in an image forming apparatus (Japanese Patent Application Publication Nos. 2009-15240, 2003-267591, and 2010-55064 (referred to as Patent Documents 1 to 3, respectively, hereinbelow)).

Speckle patterns are random patterns produced when coherent light beams, such as laser light, are applied to a surface having minute asperities, are reflected by or penetrate the surface, and interfere with each other.

It is known that, when the surface irradiated with the coherent light moves in a planar direction, because an illuminated area is moved and obtained speckle patterns are changed bit by bit, a cross-correlation peak position of an image of the speckle patterns at around the movement is moving.

Hence, the positional change (traveled distance or traveling velocity) of the surface can be measured through measurement of the positional change of the speckle patterns.

Herein, a target to be measured for its positional change in the planar direction by use of the speckle patterns is called a dynamic measured surface.

Patent Documents 1 to 3 each disclose measurement of the positional change of the dynamic measured surface by use of speckle patterns, but do not consider influence of fluctuations in a measurement environment temperature.

The measurement environment temperature is a temperature affecting measurement of the positional change of the dynamic measured surface.

Fluctuations in the measurement environment temperature affect measurement of the positional change of the dynamic measured surface, and cannot be ignored when accurate measurement is demanded.

SUMMARY OF THE INVENTION

The present invention has an objective of achieving a positional change measurement device which measures the positional change of a dynamic measured surface by using speckle patterns while easily reducing influence of fluctuations in a measurement environment temperature.

A positional change measurement device of this invention includes: a light source; an illuminating optical system configured to guide light from the light source to a measured surface; an imaging optical system; an image pickup device configured to acquire a speckle pattern by receiving reflection light from the measured surface via the imaging optical system; and detected-length compensation means for compensating for fluctuations in a detected length caused by temperature fluctuations. A positional change of the measured surface is measured based on a result of cross-correlation computation performed on multiple speckle patterns acquired at predetermined time intervals.

The positional change measurement device of this invention easily reduces influence of the fluctuations in the measurement environment temperature by satisfying the condition (1) $D/Db=0$.

BRIEF DESCRIPTION OF THE DRAWINGS

FIGS. 1A and 1B are a diagrams illustrating an embodiment.

DESCRIPTION OF THE PREFERRED EMBODIMENTS

Figure 1A:
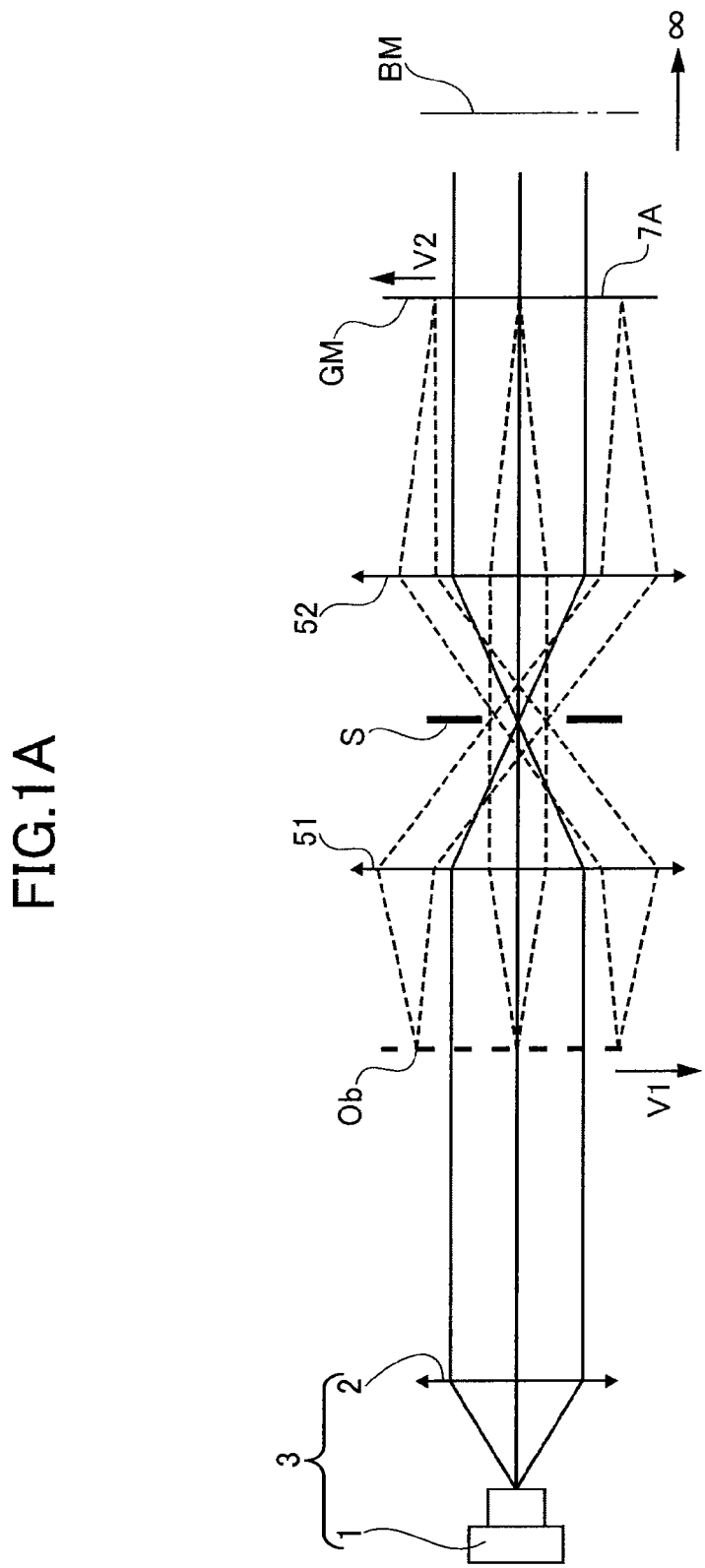

Embodiments are described below.

A positional change measurement device is configured to measure at least one of a traveled distance and a traveling velocity of a dynamic measured surface. In the following description, the traveled distance of a dynamic measured surface is referred to as a "detected length."

Once the traveling velocity of a dynamic measured surface is measured, the detected length can be obtained by performing time integration on the traveling velocity. Conversely, once the detected length is measured, the traveling velocity can be obtained by performing time differentiation on the detected length.

It should be noted that the detected length refers not only to the traveled distance of a dynamic measured surface in one axis direction, but also to the traveled distance thereof in two axis directions.

Fluctuations in a measurement environment temperature affect measurement of the detected length because of the following three factors A to C.

A. Fluctuations, due to a temperature change, in an interspace between a plane of an image of the dynamic measured surface formed by an imaging optical system (Gaussian plane) and a light-receiving surface of the imaging optical system.

B. Fluctuations, due to a temperature change, in a distance from the plane of the image of the dynamic measured surface formed by the imaging optical system to a plane of an image formed by an illuminating optical system, which plane is obtained by a coupling lens of the illuminating optical system and the imaging optical system.

C. Fluctuations, due to a temperature change, in an image-forming magnification M of the imaging optical system.

Thus, these three factors A to C have to be considered in measurement of the detected length.

Assume a case where coherent light is applied to a dynamic measured surface which is moving at a traveling velocity V1, and an image of the dynamic measured surface is formed by the imaging optical system on the light-receiving surface of an image pickup device.

Since speckles are produced in the immediate vicinity of the dynamic measured surface, a "speckle pattern" is formed on the light-receiving surface of the image pickup device.

In this regard, it is known that a traveling velocity V2 of the speckle pattern imaged by the image pickup device can be derived according to Formula (1) below where M is the imaging-forming magnification of the imaging optical system (see "Statistical Properties of Dynamic Laser Speckle and Its Applications to Velocity Measurement" (1980) in *Laser Study*, vol. 8(2), p. 45 (referred to as Non-patent Document 1 hereinbelow)).

$$V2/V1 = M\{(D/Db) - 1\} \quad (1)$$

In Formula (1), D is an interspace between the light-receiving surface of the image pickup device and the Gaussian plane of an image (plane of image formation) of the dynamic measured surface formed by the imaging optical system.

Further, Db in Formula (1) is a distance between a boiling plane of the dynamic measured surface and the Gaussian plane of the dynamic measured surface formed by the imaging optical system.

The position of the boiling plane is the position of a plane of an image formed by a laser light source, which plane is obtained via the coupling lens of the illuminating optical system and the imaging optical system.

In Formula (1), the interspace D (the factor A described above), the distance Db (the factor B described above), and the image-forming magnification M (the factor C described above) are affected by the measurement environment temperature.

Before describing the embodiment of the invention, what has been described above is explained in further detail according to a concrete example of an optical arrangement.

Figure 5:
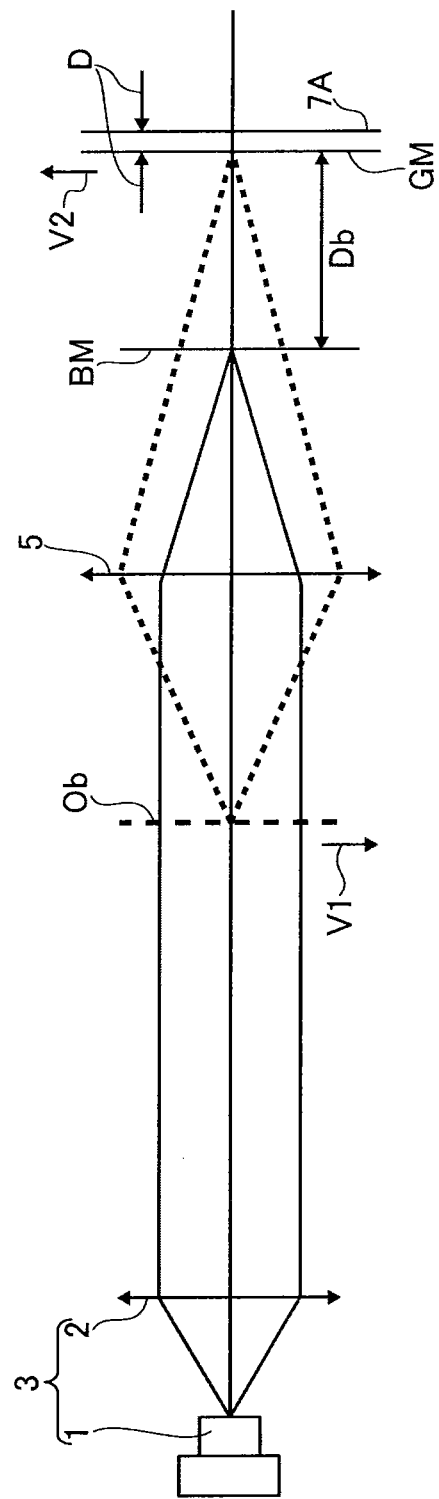
FIG. 5 is a diagram illustrating the principle of positional change measurement using speckle patterns.

Referring to FIG. 5, reference numeral 1 denotes a laser light source, 2 denotes a coupling lens, 3 denotes an illuminating optical system, Ob denotes a dynamic measured surface, and 5 denotes an imaging optical system.

In addition, reference numeral 7A denotes a light-receiving surface of an image pickup device. Note that the laser light source 1 is also referred to simply as a light source 1.

In FIG. 5, the light source 1 of the illuminating optical system 3 emits coherent laser light, and the coupling lens 2 changes the beam form of the laser light.

In FIG. 5, the laser light becomes a parallel luminous flux after passing through the coupling lens 2.

This parallel luminous flux illuminates the dynamic measured surface Ob as illumination light.

Light reflected by the dynamic measured surface Ob (detection light) is formed into an image by the imaging optical system 5 at a Gaussian plane GM which is an image formation plane. Thereby, a speckle pattern of the dynamic measured surface Ob is formed.

In FIG. 5, dotted lines show light beams for this image formation.

Meanwhile, the laser light from the light source 1 forms an image of the light source 1 via the coupling lens 2 and the imaging optical system 5. A plane of this image formation is a boiling plane BM.

As shown in FIG. 5, the interspace between the Gaussian plane GM and the light-receiving surface 7A of the image pickup device is D, and the distance between the Gaussian plane GM and the boiling plane BM is Db.

The Gaussian plane GM and the light-receiving surface 7A are depicted as being away from each other in FIG. 5. However, as far as design is concerned, the Gaussian plane GM coincides with the light-receiving surface 7A. Thus, D is zero (0) as far as design is concerned.

However, the value of D actually fluctuates due to a temporal change or an error in assembling the parts of the positional change measurement device. Moreover, as will be described later, the value of D fluctuates also by a change in the measurement environment temperature.

However, the range of such fluctuations in the value of D is extremely small, about 100 μm at most.

With respect to the ratio of the interspace D and the distance Db (which is D/Db), D=0 is satisfied as far as design is concerned, as described above.

Thus, "D/Db=0" holds true as long as the distance Db is set to be a finite value.

When "D/Db=0" holds true, Formula (1) above becomes $$V2/V1=-M.\qquad(2)$$

Thus, fluctuations in the measurement environment temperature affect only the image-forming magnification M of the imaging optical system 5.

For this reason, out of the four elements affecting the detected length, namely the light source 1, the coupling lens 2, the imaging optical system 5, and an image pickup device 7, an influence of temperature fluctuations on the imaging optical system 5 only has to be considered.

In other words, the traveling velocity V1 of the dynamic measured surface Ob can be measured with high accuracy by reducing the fluctuations in the image-forming magnification M of the imaging optical system 5 which are caused by fluctuations in the measurement environment temperature.

To be more specific, out of the light source 1, the coupling lens 2, the imaging optical system 5, and the image pickup device 7, an error in the detected length caused by the imaging optical system 5 only has to be dealt with as a problem.

Hence, the design of the positional change measurement device can be significantly simplified.

As described earlier, the value of D is zero (0) as far as design is concerned, and is still about 100 μm or less even after taking the measurement environment temperature and the temporal change into account.

On the other hand, the distance Db changes due to various conditions.

For example, if the illumination light emitted by the illuminating optical system 3 is divergent, the boiling plane BM shifts toward the Gaussian plane GM, decreasing the distance Db.

In order for Formula (2) above to hold true as a good approximation of Formula (1), the larger the distance Db, the better.

The coupling lens 2 of the illuminating optical system 3 has a positive power. The imaging optical system 5 also has a positive power.

Thus, a positive power combining those of the coupling lens 2 and the imaging optical system 5 is adjusted so that the minimum value of the distance Db fluctuating due to the fluctuations in the measurement environment temperature may be set to, for example, 1 meter (m).

In this case, even if the interspace D is 100 μm due to e.g. fluctuations in the measurement environment temperature, the maximum value of the fluctuations of D/Db is $\frac{1}{10000}$, which is negligible in Formula (1).

However, when demanded accuracy of positional change measurement is significantly high, the above value, $\frac{1}{10000}$, might not be negligible in Formula (1).

Even in such a case, sufficient measurement accuracy can be obtained by setting the minimum value of the distance Db fluctuating due to the fluctuations in the measurement environment temperature to about several meters, or preferably, about 10 meters.

One of the present invention's characteristics lies in the configuration of the imaging optical system.

Specifically, the imaging optical system includes, from the dynamic measured surface side, a first group of a positive power, an aperture stop, and a second group of a positive power.

The aperture stop is provided at the position of an image-side focal plane of the first group and of an object-side focal plane of the second group.

Then, the light-receiving surface of the image pickup device is made to coincide with the Gaussian plane of the dynamic measured surface formed by the imaging optical system.

FIG. 1A shows one embodiment of such a case in accordance with FIG. 5. To avoid complexity, elements are denoted by common reference numerals when they are considered not to cause confusion.

In the embodiment shown in FIG. 1A, the imaging optical system has a two-group configuration. Specifically, the imaging optical system includes a first group 51, a second group 52, and an aperture stop S.

Both the first group 51 and the second group 52 have a positive power.

In FIG. 1A, illumination light emitted from the illuminating optical system 3 is a parallel luminous flux.

The dynamic measured surface Ob coincides with the object-side focal plane of the first group 51.

When the dynamic measured surface Ob is illuminated with the illumination light, detection light from the dynamic measured surface Ob is condensed by the first group 51 to the position of the object-side focal point of the second group 52.

The detection light then becomes divergent light, passes through the second group 52, and becomes a parallel luminous flux.

To be more specific, in the embodiment shown in FIG. 1A, the dynamic measured surface Ob is illuminated, at a predetermined position, with illumination light which is coherent light emitted by the illuminating optical system 3 having the light source 1 and the coupling lens 2.

As far as design is concerned, the predetermined position mentioned above is a conjugate position of the light-receiving surface 7A of the image pickup device 7, obtained by the imaging optical system.

Reflection light from the dynamic measured surface Ob is guided, as detection light, to the image pickup device 7 via the imaging optical system and is formed into an image on the light-receiving surface 7A.

In the illuminating optical system 3, the coherent light emitted from the laser light source 1 is made into a parallel luminous flux by the coupling lens 2.

The imaging optical system includes, from the dynamic measured surface Ob side, the first group 51 of a positive power, the aperture stop S, and the second group 52 of a positive power.

The aperture stop S is provided at the position of the image-side focal plane of the first group 51 and of the object-side focal plane of the second group 52.

The light-receiving surface 7A of the image pickup device 7 is made to coincide with the Gaussian plane GM of the dynamic measured surface Ob formed by the imaging optical system.

In this way, in the positional change measurement device according to the embodiment shown in FIG. 1A, the coherent light emitted by the illuminating optical system 3 having the laser light source 1 and the coupling lens 2 is used as illumination light.

Then, the dynamic measured surface Ob is illuminated with this illumination light at the predetermined position, and detection light from the dynamic measured surface Ob is guided to the image pickup device 7 via the imaging optical system.

Speckle patterns of the dynamic measured surface Ob are obtained at a predetermined frame rate at predetermined time intervals, and cross-correlation computation is performed on the speckle patterns thus obtained.

Based on a result of the computation, the traveled distance (detected length) and the traveling velocity V1 of the dynamic measured surface Ob are measured.

The imaging optical system includes, from the dynamic measured surface Ob side, the first group 51 of a positive power, the aperture stop S, and the second group 52 of a positive power.

The aperture stop S is provided at the position of the image-side focal plane of the first group 51 and of the object-side focal plane of the second group 52.

The light-receiving surface 7A of the image pickup device 7 is made to coincide with the Gaussian plane GM of the dynamic measured surface Ob formed by the imaging optical system.

This coincidence between the light-receiving surface 7A and the Gaussian plane GM is achieved only as far as design is concerned. Exact coincidence cannot be actually achieved, of course, due to various tolerances in manufacture and the like, but the amount of separation between them is about 100 μm at most.

Thus, the value of D is substantially zero in the embodiment shown in FIG. 1A, as well.

In FIG. 1A, dotted lines show light beams for image formation.

The laser light from the light source 1 to be formed into an image by the coupling lens 2 and the imaging optical system exits the second group 52 of the imaging optical system as light in parallel with the optical axis.

For this reason, the position of the boiling plane BM, which is an image formation plane, recedes to infinity as far as design is concerned, and therefore, Db is an infinite value.

The value of Db is considerably large, and the value of D is, as described earlier, about 100 μm at most even after consideration of manufacture errors and the like.

Thus, D/Db is substantially zero.

Hence, the image-forming magnification M is the only factor of fluctuations in the detected length.

Specifically, out of the four elements affecting the detected length, namely the light source, the coupling lens, the imaging optical system, and the image pickup device, an influence of fluctuations in the measurement environment temperature on the imaging optical system only has to be considered.

Thus, as the measurement environment temperature, the temperature of, and in the vicinity of, the imaging optical system only has to be considered.

Since an error in the detected length caused by the imaging optical system—out of the light source, the coupling lens, the imaging optical system, and the image pickup device—is the only problem to be dealt with, the design of the positional change measurement device is significantly simplified.

If D/Db can be regarded as D/Db=0, after deriving the traveling velocity V2 of the speckle patterns by cross-correlation computation, the traveling velocity V1 of the dynamic measured surface Ob can be derived according to V1=−V2/M.

The traveled distance, which is the detected length, can be obtained by performing time integration on the traveling velocity V1.

The imaging optical system in FIG. 1A is telecentric on both of its object side and image side, and there are only small fluctuations in the image-forming magnification M due to defocusing of the dynamic measured surface Ob or the light-receiving surface 7A.

Thus, the defocusing affects the measurement of the detected length only to a small extent.

As already described above, the value of the interspace D is zero as far as design is concerned, and is about 100 μm at most even after including dimensional tolerances in the actual device.

Further, even if the positional relation between the light source 1 and the coupling lens 2 of the illuminating optical system 3 fluctuates at the component tolerance level, fluctuations in the distance Db can fall within about several meters to several hundred meters.

If D=100 μm and Db=10 m, D/Db is 1/100000, i.e., 0.001%. Thus, the influence contributing to an error in the detected length is small.

Hence, fluctuations in the detected length can be suppressed by suppressing fluctuations in the form of the luminous flux of the illumination light which are caused by fluctuations in the positional relation between the light source 1 and the coupling lens 2 of the illuminating optical system 3.

In the positional change measurement device of the present invention, the imaging optical system is telecentric on both of its object-side space and image-side space.

Thus, even if the dynamic measured surface Ob is defocused in the direction of the optical axis of the imaging optical system, almost no fluctuation occurs in the image-forming magnification M of the imaging optical system.

Similarly, even if the image pickup device 7 is defocused in the direction of the optical axis of the imaging optical system, almost no fluctuation occurs in the image-forming magnification M.

Since these advantageous effects are obtained synergistically, fluctuations in the detected length can be further reduced compared to the case of using the imaging optical system having a one-group configuration, described with reference to FIG. 5.

Figure 2:
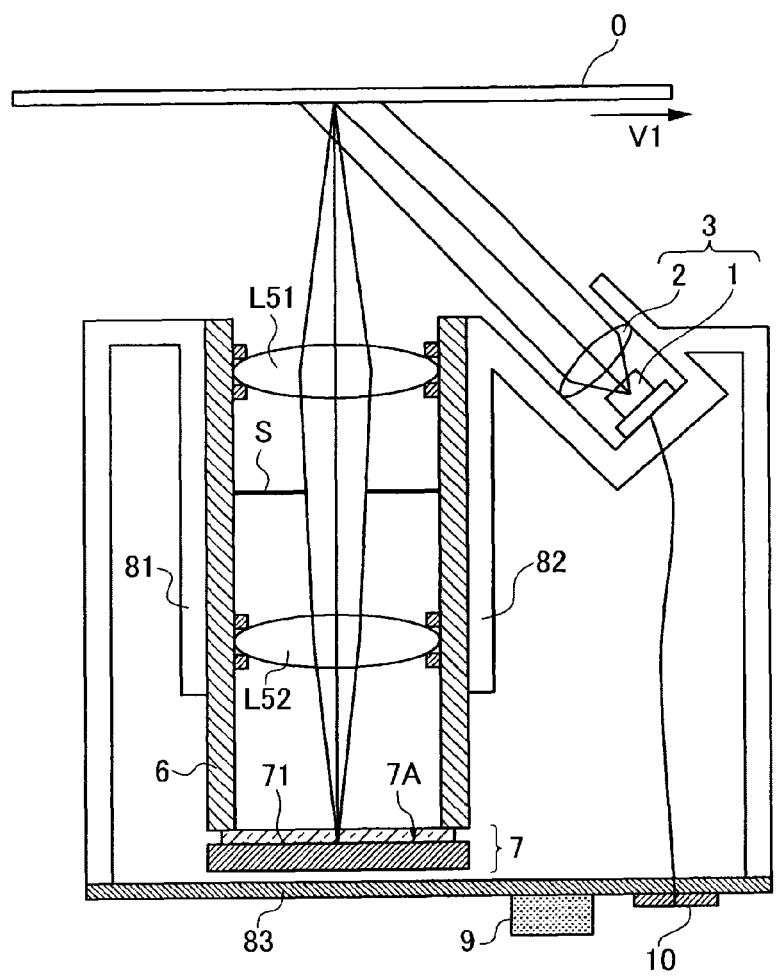
FIG. 2 is a diagram illustrating one embodiment of a positional change measurement device.

FIG. 2 is a diagram illustrating one embodiment of the positional change measurement device.

In FIG. 2, reference numeral 0 denotes a mobile object, 1 denotes a laser light source, 2 denotes a coupling lens, L51 and L52 denote lenses, and 6 denotes a lens barrel.

The lens L51 forms the first group 51 described above, and the lens L52 forms the second group 52 described above.

In addition, reference numeral 7 denotes an image pickup device, 71 denotes a covering glass for the image pickup device 7, and 7A denotes a light-receiving surface of the image pickup device 7.

Moreover, reference numerals 81, 82 denote housings, 83 denotes a bottom plate, 9 denotes a computing unit, and 10 denotes a light-source driving unit.

The laser light source 1 (also referred to simply as a light source 1 hereinafter) is a semiconductor laser (also referred to as an LD hereinafter), and emits divergent laser light (which is coherent light).

The divergent laser light emitted is reduced in its divergence by the coupling lens 2.

In this embodiment, the divergent laser light is transformed into a parallel luminous flux by the coupling lens 2 and becomes illumination light.

The coupling lens 2 and the light source 1 constitute a main part of the illuminating optical system 3. In other words, the illuminating optical system 3 has the light source 1 and the coupling lens 2.

As shown in FIG. 2, the illumination light illuminates a surface of the mobile object 0.

The mobile object 0 is, for example, an intermediate transfer belt mentioned earlier, and is configured to move in an arrowed direction at a predetermined velocity V1.

The surface of the mobile object 0 illuminated with the illumination light is the dynamic measured surface Ob, and the traveled distance of the dynamic measured surface Ob is the detected length described above.

In this embodiment, the dynamic measured surface Ob is illuminated with a parallel luminous flux produced by the illuminating optical system 3, as described above.

The lenses L51, L52 constitute the imaging optical system together with the aperture stop S, and are attached to the lens barrel 6.

The lens barrel 6 is retained by the housings 81, 82, and is integrated with the light source 1 and the coupling lens 2 constituting the illuminating optical system 3.

The image pickup device 7 is securely provided at a position corresponding to a lower end portion of the lens barrel 6 in FIG. 2.

When retained by the housings 81, 82, the illuminating optical system 3, the lenses L51, L52 and the aperture stop S constituting the imaging optical system, and the image pickup device 7 have predetermined positional relations to one another.

The bottom plate 83 is integrated with the housings 81, 82, and the computing unit 9 and the light-source driving unit 10 are attached to an outer surface of the bottom plate 83.

Preferably, a PCB substrate can be used as the bottom plate 83.

In this way, the positional relations of the illuminating optical system 3, the imaging optical system, and the image pickup device 7 are determined by the housings 81, 82, which are integrated with the bottom plate 83. Thus, these elements are packaged as the positional change measurement device.

The distance between the packaged positional change measurement device and the dynamic measured surface Ob is maintained to be a predetermined value by use of a spacer or the like.

The computing unit 9 is configured to obtain the detected length by performing predetermined computation, namely known cross-correlation computation, based on output of the image pickup device 7.

A field-programmable gate array (FPGA) is preferably used as the computing unit 9, and the FPGA is used in this embodiment.

As the light-source driving unit 10, an LD driver IC configured to drive an LD, which is the light source 1, can be used. The computing unit 9 also controls the driving performed by the light-source driving unit 10.

In FIG. 2, the light source 1 is electrically connected to the light-source driving unit 10. Positional change measurement is carried out in the following manner.

The illuminating optical system 3 emits illumination light by lighting the light source 1, and the dynamic measured surface Ob is thereby illuminated at a predetermined position.

This predetermined position is, as described earlier, a conjugate position of the light-receiving surface 7A of the image pickup device 7, obtained by the imaging optical system.

Then, the detection light, which is reflection light from the dynamic measured surface Ob, is guided to the light-receiving surface 7A of the image pickup device 7 by the imaging optical system constituted by the lenses L51, L52 and the aperture stop S, and is formed into an image on the light-receiving surface 7A.

By this image formation, a speckle pattern of the dynamic measured surface Ob is imaged on the light-receiving surface 7A. The speckle pattern moves at the traveling velocity V2 according to the traveling velocity V1 of the dynamic measured surface Ob.

The image pickup device 7 acquires the speckle pattern of the dynamic measured surface Ob at a predetermined frame rate.

This predetermined frame rate can be selected appropriately within the range of several dozen to several thousand fps, for example.

Then, the computing unit 9 performs cross-correlation computation on the speckle patterns acquired at predetermined time intervals (1/frame rate).

A result of this computation is used to measure the traveling velocity V1 of the dynamic measured surface Ob.

To be more specific, the traveling velocity V2 of the speckle patterns is determined, and based on the traveling velocity V2, the traveling velocity V1 of the dynamic measured surface Ob is determined.

By performing time integration on the traveling velocity V1 thus determined, the detected length, corresponding to the traveled distance, can be obtained.

The cross-correlation computation mentioned above is a computation already known from, for example, Non-patent Document 1 and the like. The detected length can be calculated based on a shift amount of a correlation peak obtained by this computation.

The following is well known as one example of the cross-correlation computation.

Specifically, two speckle patterns imaged at a predetermined frame rate are expressed as f1 and f2.

Fourier transform computations on the speckle patterns f1 and f2 are expressed as F[f1] and F[f2], respectively, and the cross-correlation computation is expressed as ▲.

Then, the cross-correlation computation on the speckle patterns f1, f2 can be derived by the following arithmetic expression:

$$f1 ▲ f2^* = F^{-1}[F[f1] \cdot F[f2]^*], \text{ where * indicates the complex conjugate.}$$

The positional change measurement device shown in FIG. 2 achieves its compact size by mounting the computing unit 9 and the light-source driving unit 10 on the same bottom plate 83 and integrating the bottom plate 83 with the housings 81, 82.

The positional change measurement device thus reduced in size includes multiple heaters as its component.

Thus, heat produced by the image pickup device 7, the LD driver IC (the light-source driving unit 10), the FPGA (the computing unit 9), the LD (the light source 1), and the like are thought to be the cause of the increase in the measurement environment temperature.

However, as described above, as long as the distance Db and the interspace D satisfy a condition (1), namely D/Db≈0, the change in the measurement environment temperature affects only the fluctuations in the image-forming magnification M of the imaging optical system.

The distance Db and the interspace D can satisfy the condition (1) by appropriately setting how the illuminating optical system illuminates the dynamic measured surface via the imaging optical system.

Then, for example, as in the embodiment described above, it is also possible for the distance Db and the interspace D to satisfy the condition (1) irrespective of the fluctuations in the measurement environment temperature.

Thus, fluctuations in the accuracy of the positional change measurement can be reduced by reducing the amount of fluctuations in the image-forming magnification M of the imaging optical system which are caused by a change in the measurement environment temperature.

It is possible to configure the imaging optical system such that the image-forming magnification M thereof may be insensitive to (i.e., less likely to be changed by) temperature change.

For example, the lenses L51, L52 forming the first group 51 and the second group 52 are made from glass materials less likely to fluctuate in refractive index or volume due to temperature.

The lens barrel 6 is also made from a material whose coefficient of volume expansion is sufficiently small.

In this way, an imaging optical system whose image-forming magnification M fluctuates only by a small amount due to fluctuations in the measurement environment temperature can be achieved.

However, when high accuracy is required for the positional change measurement, even such an imaging optical system whose image-forming magnification M fluctuates to a small extent might be insufficient.

In examples described below, a group-interspace adjustment mechanism is provided, in view of the above point.

The group-interspace adjustment mechanism is configured to adjust the interspace between the first group and the second group constituting the imaging optical system, according to the amount of fluctuations in the focal length of each of the first and second groups, which fluctuations are caused by fluctuations in the measurement environment temperature.

The interspace between the first and second groups is adjusted so as to suppress the change in the image-forming magnification M due to a change in the measurement environment temperature.

The image-forming magnification of the imaging optical system is constant in an area of paraxial beams, but in an actual imaging optical system, slightly varies depending on the height of a real image (called a real-image height hereinbelow).

EXAMPLES

Examples are described below.

Example 1

In Example 1 below, for five object heights selected, it is checked how the measurement environment temperature changes an average value of magnifications of five real-image heights obtained from the five object heights.

As shown in FIG. 1B, the first group 51 and the second group 52 of the imaging optical system were formed by two lenses L1, L2 and two lenses L3, L4, respectively.

The lenses L1, L2 were attached together to form the first group 51, and the lenses L3, L4 were attached together to form the second group 52.

The lens L1 of the first group 51 on the object side had a focal length of 5.991 mm, and a glass material thereof was "E-C8" manufactured by HOYA Corporation.

The lens L2 of the first group 51 on the aperture stop S side had a focal length of −11.838 mm, and a glass material thereof was "PCD4" manufactured by HOYA Corporation.

The lens L3 of the second group 52 on the aperture stop S side had a focal length of −9.471 mm, and a glass material thereof was "PCD4" manufactured by HOYA Corporation.

The lens L4 of the second group 52 on the image side had a focal length of 4.793 mm, and a glass material thereof was "E-C8" manufactured by HOYA Corporation.

A focal length f1 of the first group 51 was 12.5 mm, and a focal length f2 of the second group 52 was 10.0 mm. These are values observed when the measurement environment temperature was 20° C.

The image-side focal point of the first group 51 and the object-side focal point of the second group 52 were made to coincide in position, and the aperture stop S was placed at this coincidence position.

If this imaging optical system is used as shown in FIG. 1A, such that the dynamic measured surface Ob is located at the position of the object-side focal point of the first group 51, and the light-receiving surface 7A is made to coincide with the Gaussian plane, the image-forming magnification is 0.8.

In Example 1, the distance relations from the dynamic measured surface Ob to the light-receiving surface 7A were defined as shown in FIG. 1B.

Further, the range of change in the measurement environment temperature was defined as follows.

Specifically, under a room temperature of 20° C., immediately after current is inputted to the positional change measurement device, an increase, by a heat source, in the temperature of the positional change measurement device is considered to be almost zero, and hence, the temperature of the imaging optical system is 20° C.

The temperature of the imaging optical system was saturated at 85° C. after the positional change measurement device received the current input at the 20° C. room temperature and then increased in temperature due to the heat source.

The focal lengths of the first group 51 and the second group 52 in Example 1 changed as follows when the temperature of the imaging optical system (the measurement environment temperature) changed from 20° C. to 85° C.

Specifically, the fluctuation amount of the focal length f1 was $-2 \times 10^{-2}$ (μm), and the fluctuation amount of the focal length f2 was $-2 \times 10^{-2}$ (μm).

Thus, the change amount of the focal length of each of the first group 51 and the second group 52 was considerably small and can be regarded as substantially zero.

A possible reason why a change in the measurement environment temperature causes fluctuations in the focal lengths of the first group 51 and the second group 52 is that the wavelength of light emitted by the light source 1 changes depending on temperature.

Example 1 assumes that the wavelength of light emitted by the light source 1 fluctuates from a wavelength of 649.9 nm to a wavelength of 668.532 nm within the change range of the measurement environment temperature.

A considerably minute change in the focal lengths slightly changes the magnification of the imaging optical system.

There are times when measurement requires such a high accuracy that an error imposed by this slight magnification change on the detected length is problematic.

The inventors have found that the magnification change can be suppressed by adjusting the interspace between the first group 51 and the second group 52 of the imaging optical system according to a change in the measurement environment temperature.

To be more specific, a ratio of the real-image heights was set as 0.2:0.4:0.6:0.8:1.0, with a real-image height corresponding to the largest object height being normalized to 1.0, and an average value of magnifications of these five real-image heights was obtained.

Then, for these real-image heights, a change rate (%) was observed between the average magnification under the reference temperature of 20° C. and the average magnification under the measurement environment temperature of 85° C.

Under the measurement environment temperature of 85° C., the interspace between the first group 51 and the second group 52 was changed at 0.005 mm intervals, with the design reference being set to zero.

In this regard, it was found that the amount of change in the group interspace and the amount of change in the magnification (the amount of change in the average value described above) have a linear relation as shown in FIG. 3.

Figure 3:
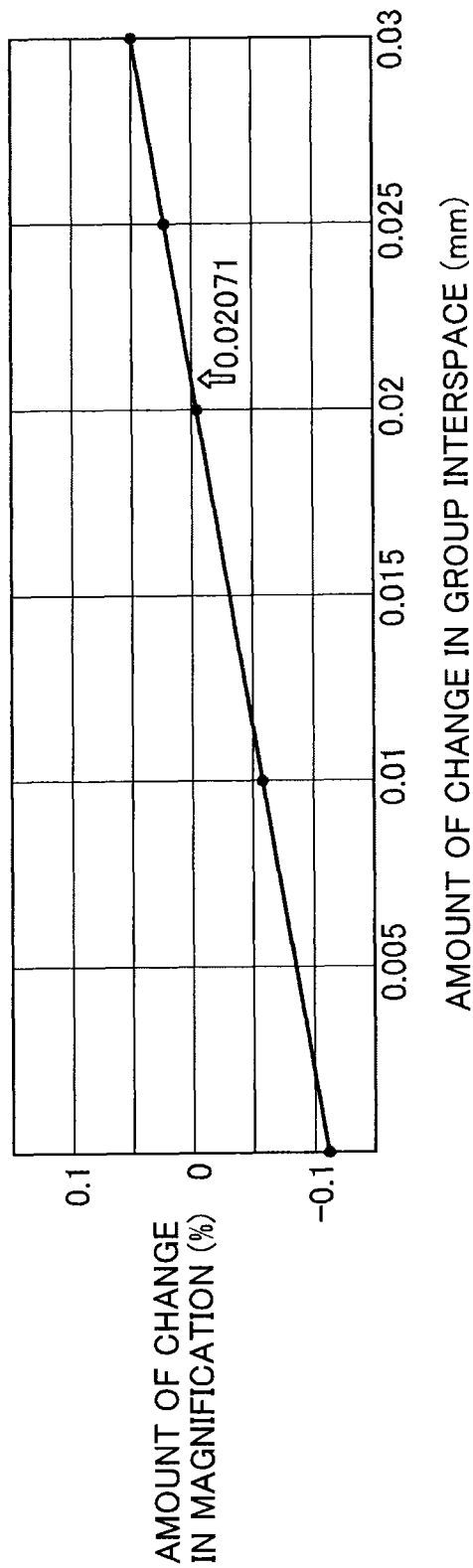
FIG. 3 is a diagram illustrating Example 1.

The vertical axis in FIG. 3 represents the amount of change in the magnification, which is a change rate (%) of the magnification between the reference temperature of 20° C. and the measurement environment temperature of 85° C. (the magnification being an average value of magnifications of the five real-image heights).

The horizontal axis in FIG. 3 represents the amount of change in the interspace between the first group 51 and the second group 52 of the imaging optical system.

The straight line in FIG. 3 can be expressed, as a good approximation, $$y=5.5016x-0.1139,$$

where y is the amount on the vertical axis and x is the amount on the horizontal axis.

As shown in FIG. 3, x is about +20.71 µm when y is 0.

Thus, the amount of change in the average magnification can approximate to almost 0 if the group interspace becomes longer by 20.71 µm than its designed value when the measurement environment temperature reaches 85° C.

It was found that, by so adjusting the group interspace, the fluctuations in the average magnification of the real-image heights of the imaging optical system, which fluctuations are caused by fluctuations in the measurement environment temperature of the positional change measurement device, could be suppressed to 0.01% or less.

In the positional change measurement device of the present invention, since parameter of the condition (1) is D/Db=0 as already described, the absolute values of the change rate of the magnification and of the change rate of the detected length are equal to each other.

This means that the fluctuations in the detected length can be suppressed to 0.01% or less, as well.

The positional change measurement device of Example 1 has the group-interspace adjustment mechanism.

The group-interspace adjustment mechanism is configured to adjust the interspace between the first group 51 and the second group 52 constituting the imaging optical system, according to the amount of fluctuations in the focal length of each of the first group 51 and second group 52, which fluctuations are caused by fluctuations in the measurement environment temperature.

The group-interspace adjustment mechanism adjusts the group interspace so as to suppress fluctuations in an average value of magnifications of multiple real-image heights in a speckle pattern, which fluctuations are caused by fluctuations in the measurement environment temperature.

In Example 1, the group interspace between the first and second groups is adjusted to increase by +20.71 µm when the measurement environment temperature changes from 20° C. to 85° C.

Figure 4:
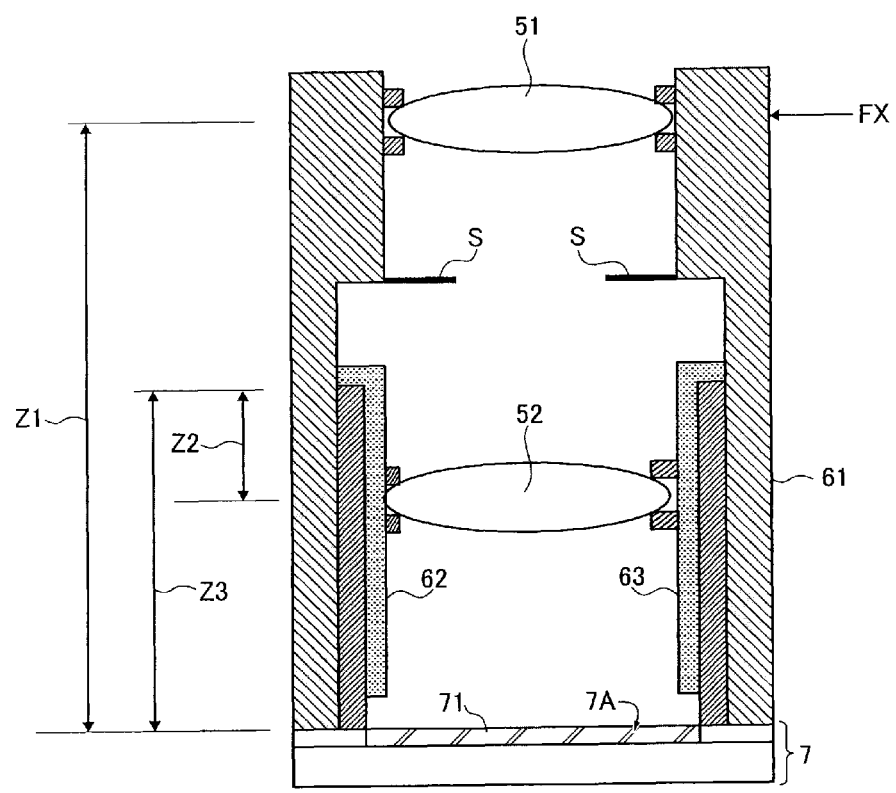
FIG. 4 is a diagram illustrating Example 1.

FIG. 4 shows the group-interspace adjustment mechanism of Example 1. The group-interspace adjustment mechanism of Example 1 adjusts the group interspace described above as follows.

FIG. 4 shows a retention mechanism configured to retain the imaging optical system.

This retention mechanism is formed by a combination of lens barrels.

In FIG. 4, reference numerals 51, 52, and S denote a first group, a second group, and an aperture stop, respectively, as they have done above.

The first group 51 and the second group 52 are each depicted as being a single lens for simplicity of illustration, but as described above, each of them is actually formed by two lenses attached together in Example 1.

When the measurement environment temperature is the reference temperature of 20° C., the first group 51 has a focal length f1 of 12.5 mm, and the second group 52 has a focal length f2 of 10.0 mm.

The positional relation of the dynamic measured surface Ob, the light-receiving surface 7A of the image pickup device 7, the first group 51, the second group 52, and the aperture stop S when the measurement environment temperature is the reference temperature is as shown in FIG. 1B.

As described earlier, when the measurement environment temperature reaches 85° C., the focal length of each of the first group 51 and the second group 52 changes by $-2\times10^{-2}$ µm.

In FIG. 4, reference numeral 61 denotes a first lens barrel, 62 denotes a second lens barrel, and 63 denotes a third lens barrel.

The first lens barrel 61 retains the first group 51, and the second lens barrel 62 retains the second group 52. The third lens barrel 63 is provided between the first lens barrel 61 and the second lens barrel 62.

The first lens barrel 61 is retained by the housings 81, 82 shown in FIG. 2.

The first lens barrel 61 is slidable relative to the housings 81, 82, but fixed to the housings 81, 82 at a position FX, along the axis, at which the first lens barrel 61 retains the first group 51.

Thus, although the first lens barrel 61 thermally expands or contracts due to a change in the measurement environment temperature and slides axially relative to the housings 81, 82, the first group 51 does not change in position.

The aperture stop S is also securely retained by the first lens barrel 61.

The third lens barrel 63 is fitted to an inner circumference of the first lens barrel 61.

The second lens barrel 62 is fitted to an inner circumference of the third lens barrel 63. The second lens barrel 62 can slide relative to the third lens barrel 63.

However, an upper end portion of the second lens barrel 62, in FIG. 4, is fixed to an upper end portion of the third lens barrel 63.

The first lens barrel 61 and the third lens barrel 63 are both fixed to the image pickup device 7 at their lower end portions in FIG. 4.

As shown in FIG. 4, distances Z1, Z2, and Z3 are set based on the position of abutment between the image pickup device 7 and the first and third lens barrels 61, 63.

The distance Z1 is a distance from the abutment position to the first group 51, and the distance Z2 is a distance from the upper end portion of the third lens barrel 63 to the second group 52.

The distance Z3 is a distance from the abutment position to the upper end portion of the third lens barrel 63.

The coefficients of linear expansion of materials forming the first lens barrel 61, the second lens barrel 62, and the third lens barrel 63 are expressed here as $\alpha 1$, $\alpha 2$, and $\alpha 3$, respectively.

Then, when the measurement environment temperature increases from 20° C. to 85° C., the distances Z1, Z2, and Z3 expands linearly by $65 \cdot \alpha \cdot Z1$, $65 \cdot \alpha 2 \cdot Z2$, and $65 \cdot \alpha 3 \cdot Z3$, respectively.

When the measured environment temperature is 20° C., the interspace between the first group 51 and the second group 52 is:

$$Z1-(Z3-Z2)=Z1+Z2-Z3.$$

Thus, when the measurement environment temperature is 85° C., the group interspace is:

$$Z1(1+65 \cdot \alpha 1)+Z2(1+65 \cdot \alpha 2)-Z3(1+65 \cdot \alpha 3).$$

Therefore, a change amount $\Delta L$ of the group interspace is:

$$\Delta L=65(\alpha 1 \cdot Z1+\alpha 2 \cdot Z2-\alpha 3 \cdot Z3).$$

When $65 \cdot \alpha 1 \cdot Z1=\Delta Z1$, $65 \cdot \alpha 2 \cdot Z2=\Delta Z2$, and $65 \cdot \alpha 3 \cdot Z3=\Delta Z3$, $$\Delta L=\Delta Z1+\Delta Z2-\Delta Z3.$$

In Example 1, adjustment was made so that this change amount $\Delta L$ may be 20.71 µm.

Specifically, the first lens barrel 61 and the third lens barrel 63 were both made from "SUS 430," and the second lens barrel 62 was made from a polyamide-imide resin.

The coefficient of linear expansion (unit: 1/K, where K is Kelvin temperature) of the SUS 430 is $1.04 \times 10^{-5}$, and that of the polyamide-imide resin is $3.8 \times 10^{-5}$.

Hence, $\alpha 1=\alpha 3=1.04 \times 10^{-5}$ (1/K), and $\alpha 2=3.8 \times 10^{-5}$ (1/K). Based on this, the distances Z1 to Z3 were set as follows: Z1=27.060 mm, Z2=0.419 mm, and Z3=21.78 mm.

Thus, the amounts of change of the distances Z1 to Z3 due to a change in the measurement environment temperature from 20° C. to 85° C. were $\Delta Z1=18.29$ µm, $\Delta Z2=7.805$ µm, and $\Delta Z3=5.381$ µm, respectively.

Thus, $\Delta Z1+\Delta Z2-\Delta Z3=+20.71$ µm was achieved.

As a result, the rate of fluctuation in the average magnification of the five real-image heights was minimized to $-1.54 \times 10^{-6}(\%)$.

As already described, since D/Db=0 is satisfied in Example 1, the change rate of the magnification M equals the change rate of the detected length.

Consequently, fluctuations in the detected length was suppressed to $-1.54 \times 10^{-6}(\%)$.

This can be regarded that the fluctuations in the detected length was reduced to substantially zero.

When the positional change measurement device of Example 1 is actually manufactured, an error in the detected length due to dimensional tolerances of manufacturable lens barrel and lens components is larger than the above-described design median value.

However, this error in the detected length due to the dimensional errors is about +0.008% to −0.005%, which indicates that the actual device still has favorable performance even with those manufacture tolerances.

Since it is estimated that the dimensional tolerance is 10 µm, the number of Newton rings of the lens components is three or less, and the grade of the glass material is the second grade, the error described above is sufficiently within the manufacturable tolerance.

In the positional change measurement device of the above embodiments, coherent light from the illuminating optical system 3 having the laser light source 1 and the coupling lens 2 is used as illumination light.

Then, the dynamic measured surface Ob is illuminated with this illumination light at the predetermined position, and detection light from the dynamic measured surface Ob is guided to the image pickup device 7 via the imaging optical system.

The image pickup device 7 acquires speckle patterns of the dynamic measured surface Ob at a predetermined frame rate, and cross-correlation computation is performed on the speckle patterns acquired at predetermined time intervals.

Based on a result of this computation, at least one of the traveled distance and the traveling velocity of the dynamic measured surface Ob is measured.

The imaging optical system includes, from the dynamic measured surface Ob side, the first group 51 of a positive power, the aperture stop S, and the second group 52 of a positive power.

The aperture stop S is provided at the position of the image-side focal plane of the first group 51 and of the object-side focal plane of the second group 52.

Then, the light-receiving surface 7A of the image pickup device 7 is made to coincide with the Gaussian plane GM of the dynamic measured surface Ob formed by the imaging optical system.

The form of illumination light via the imaging optical system onto the dynamic measured surface Ob is defined so that the condition (1) may be satisfied by: the distance Db between the boiling plane BM of the dynamic measured surface Ob and the Gaussian plane GM of the dynamic measured surface Ob formed by the imaging optical system; and the interspace D between the Gaussian plane GM and the light-receiving surface 7A of the image pickup device 7.

Further, in the positional change measurement device of Example 1, the first group 51 and the second group 52 of the imaging optical system are each formed by two or more lenses made of different materials (namely, lenses L1, L2 and lenses L3, L4).

Then, the distance Db and the interspace D satisfy the condition (1), D/Db≈0, irrespective of fluctuations in the measurement environment temperature.

In Example 1 described above, the group-interspace adjustment mechanism adjusts the interspace between the first group 51 and the second group 52 constituting the imaging optical system, according to the amount of fluctuations in the focal length of each of the first and second groups 51, 52, which fluctuations are caused by fluctuations in the measurement environment temperature.

The group-interspace adjustment mechanism is configured to suppress fluctuations in the average magnification of multiple real-image heights in a speckle pattern, which fluctuations are caused by the fluctuations in the measurement environment temperature.

The group-interspace adjustment mechanism of Example 1 has multiple lens barrels, including at least the first lens barrel 61 for retaining the first group 51 and the second lens barrel 62 for retaining the second group 52.

The first lens barrel 61 and the second lens barrel 62 have different coefficients of linear expansion from each other, and one of the first lens barrel 61 and the second lens barrel 62 is fixed at one end to the image pickup element 7.

Then, the expansion and contraction of the multiple lens barrels due to fluctuations in the measurement environment temperature are utilized to suppress the fluctuations in the average magnification of multiple real-image heights in a speckle pattern, which fluctuations are caused by fluctuations in the measurement environment temperature.

In the positional change measurement device of Example 1, the group-interspace adjustment mechanism has the first lens barrel 61 configured to retain the first group 51, the third lens barrel 63 configured to be slidable relative to the first lens barrel 61, and the second lens barrel 62 configured to be slidable relative to the third lens barrel 63 and to retain the second group 52.

The first lens barrel 61 and the third lens barrel 63 are fixed to the image pickup device 7 at their one ends.

The expansion and contraction of the first lens barrel 61 or third lens barrel 63 due to fluctuations in the measurement environment temperature are utilized to minimize the fluctuations in the average magnification of multiple real-image heights in a speckle pattern, which fluctuations are caused by fluctuations in the measurement environment temperature.

A change rate of the focal length of each of the first group 51 and the second group 52 constituting the image pickup device 7 used in the positional change measurement device of Example 1 described above is 0.001% or less of the focal length upon the maximum change of the measurement environment temperature.

As is clear from the above description, the first lens barrel 61 and the third lens barrel 63 used in Example 1 are made of the same material.

Thus, they may be formed not as separate members, but as an integral member.

The number of lens barrels used for retaining the first and second groups may be increased to four or more. This allows an increase in the degree of freedom for combining materials of different coefficients of linear expansion.

As a result, the adjustment of the group interspace is facilitated.

The positional change measurement device of Example 1 has been described above. In the following, concrete configuration examples of the first to third lens barrels are described with reference to FIGS. 7 to 13.

Figure 7:
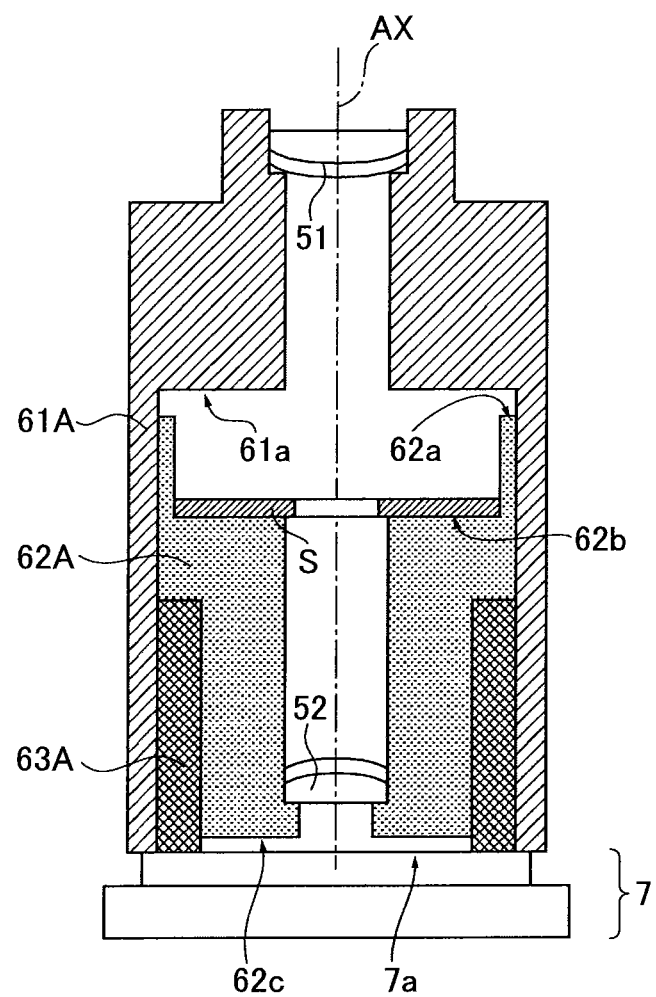
FIG. 7 is a diagram illustrating a concrete example of the positional change measurement device.

In FIG. 7, reference numeral 61A denotes a first lens barrel, 62A denotes a second lens barrel, 63A denotes a third lens barrel, S denotes an aperture stop, and 7 denotes an image pickup device.

In addition, reference numerals 51 and 52 denote first and second groups, respectively, of the imaging optical system.

The first lens barrel 61A, the second lens barrel 62A, and the third lens barrel 63A are all rotationally symmetric with respect to an axis AX.

The first lens barrel 61A retains the first group 51, and the second lens barrel 62A retains the second group 52.

The axis AX is an axis common to the first group 51 retained by the first lens barrel 61A and the second group 52 retained by the second lens barrel 62A, i.e., the axis AX is the optical axis of the imaging optical system.

As described above, the axis AX is also a rotational-symmetry axis of all the first to third lens barrels 61A to 63A.

Thus, the axis AX is called a lens barrel axis with regard to the lens barrels, and called an optical axis with regard to the imaging optical system. When no differentiation is necessary, the lens barrel axis and the optical axis are simply called the axis AX.

The first to third lens barrels 61A to 63A are fitted to each other such that they can slide relative to each other in the direction of the lens-barrel axis AX.

Lower end portions of the first lens barrel 61A and of the third lens barrel 63A in FIG. 7 abut, and are fixed to, an upper surface 7a of the image pickup device 7.

In its internal structure, the first lens barrel 61A has a planar portion 61a orthogonal to the axis AX.

The second lens barrel 62A has planar portions 62a, 62b, and 62c orthogonal to the axis AX.

The planar portions 62a and 62b form a step in the direction of the axis AX on the first group 51 side, and the aperture stop S is provided on the planar portion 62b.

The planar portion 62a has a gap between itself and the planar portion 61a of the first lens barrel 61A. This gap is called a gap a herein for convenience sake.

The planar portion 62c forming a lower end portion of the second lens barrel 62A in FIG. 7 has an interspace between itself and the upper surface 7a of the image pickup device 7. This interspace is called an interspace a herein for convenience sake.

In addition, there is a void portion between the planar portion 61a of the first group 61A and the planar portion 62b of the second lens barrel 62A. This void portion is called a void portion a herein for convenience sake.

First, with regard to the interspace a, the second lens barrel 62A thermally expands downward in FIG. 7 relative to the third lens barrel 63A.

If a decrease in the interspace a due to this thermal expansion makes the planar portion 62c of the second lens barrel 62A abut the upper surface 7a of the image pickup device 7, the amount of expansion of the second lens barrel 62a due to the thermal expansion thereof is restricted.

Then, the second group 52 cannot attain its desired displacement amount in the direction of the axis AX.

Thus, the interspace a is set to such a value that does not make the second lens barrel 62A and the image pickup device 7 come into contact with each other irrespective of the fluctuations in the measurement environment temperature.

In this way, irrespective of the fluctuations in the measurement environment temperature, the planar portion 62a of the second lens barrel 62A, which is an endmost portion of the second lens barrel 62A on the first group 51 side in the direction of the lens barrel axis AX does not come into contact with the planar portion 61a of the first lens barrel 61A, which is a surface facing the above-described endmost portion of the second lens barrel 62A.

Next, with regard to the gap a, when the measurement environment temperature increases, both of the second lens barrel 62A and the third lens barrel 63A thermally expand.

In this event, the planar portion 62a of the second lens barrel 62A expands toward the planar portion 61a of the first lens barrel 61A.

If the planar portion 62a abuts the planar portion 61a as a result of this expansion, the amount of thermal expansion of the second lens barrel 62A is restricted, preventing attainment of a desired displacement amount.

As a result, a desired group-interspace change amount cannot be attained, either.

For this reason, the interspace a is set to such a value that does not make the planar portion 62a of the second lens barrel 62A on the first group 51 side come into contact with the planar portion 61a, irrespective of fluctuations in the measurement environment temperature.

Figure 8:
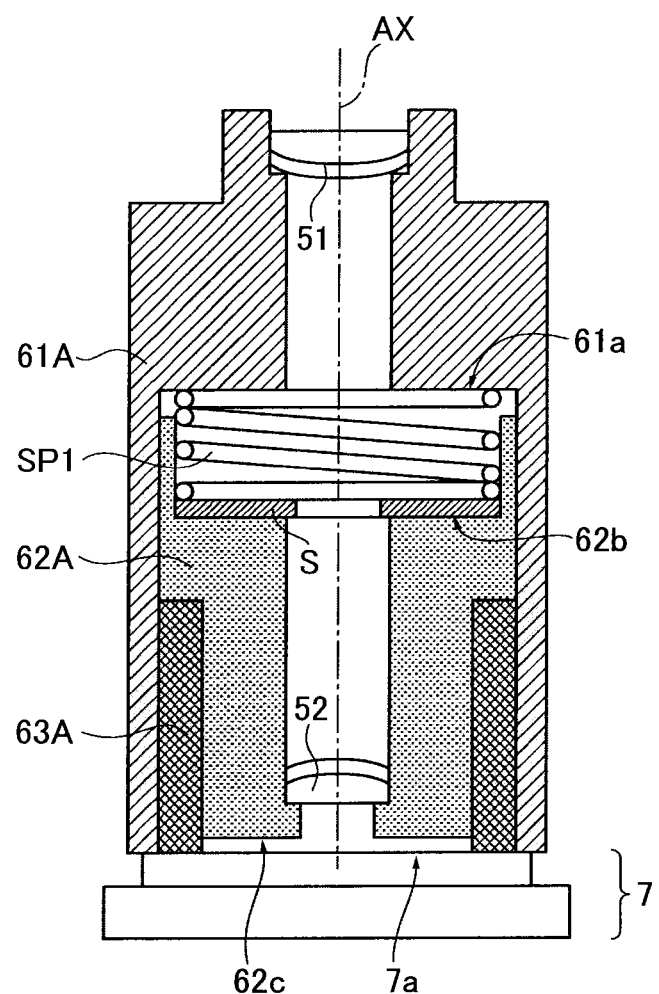
FIG. 8 is a diagram illustrating another concrete example of the positional change measurement device.

FIG. 8 is a modification of FIG. 7. To avoid complexity, elements are denoted by common reference numerals in FIGS. 7 and 8 when they are considered not to cause confusion.

A spring member SP1, which is a compressive elastic member, is placed in the void portion a between the planar portion 61a of the first lens barrel 61A and the planar portion 62b of the second lens barrel portion 62A.

More specifically, between the first lens barrel 61A and the second lens barrel 62A, the group-interspace adjustment mechanism has the repulsive spring member SP1 exerting an elastic force pressing the second lens barrel 62A against the third lens barrel 63A.

The spring member SP1 is repulsive, and exerts an elastic force to press the second lens barrel 62A downward in FIG. 8.

This pressing force presses the second lens barrel 62A against the third lens barrel 63A to not only ensure contact between the second lens barrel 62A and the third lens barrel 63A, but also guarantee abutment of the third lens barrel 63A against the image pickup device 7.

If, during positional change measurement, the third lens barrel 63A separates from the image pickup device 7 due to disturbance such as vibration, the group interspace may not be able to achieve its desired thermal-change amount.

The spring member SP1 pressing the second lens barrel 62A toward the image pickup device 7 contributes to obtaining an advantageous effect of ensuring that the third lens barrel 63A does not separate from the image pickup device 7.

Figure 9:
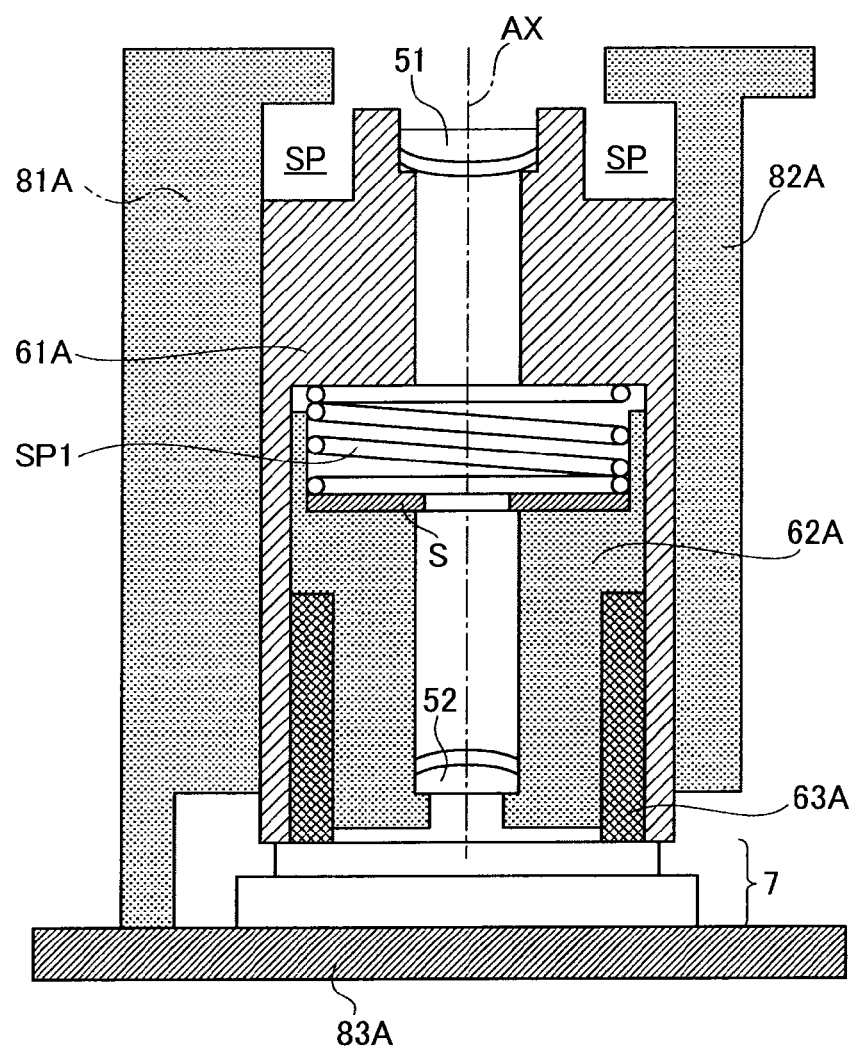
FIG. 9 is a diagram illustrating yet another concrete example of the positional change measurement device.

FIG. 9 shows a state in which the housings 81A, 81B are fitted to the concrete example shown in FIG. 8. Reference numeral 83A denotes a bottom plate.

In this example, the image pickup device 7 and the housing 81A are fixed to the bottom plate 83A at their lower portions in FIG. 9, and the first lens barrel 61A and the third lens barrel 63A are fixed to the image pickup device 7.

Thus, the first lens barrel 61A and the third lens barrel 63A thermally expand based on the upper surface of the image pickup device 7, and in that event, slide relative to each other as well as to the housings 81A, 82A.

In the concrete example shown in FIG. 9, a space SP is provided between the first lens barrel 61A and the housings 81A, 82A, at an upper portion along the axis AX.

Hence, expansion of the first lens barrel 61A due to its thermal expansion is not inhibited by the housings 81A, 82A.

This enables avoidance of the problem in which a desired amount of change in the group interspace cannot be obtained because the housings 81A, 82A restrict the amount of thermal displacement of the first lens barrel 63A.

Thus, the space SP is set to a value which does not make the housings 81A, 82A come into contact with the first lens barrel 61A in the direction of the lens barrel axis AX, irrespective of fluctuations in the measurement environment temperature.

Figure 10:
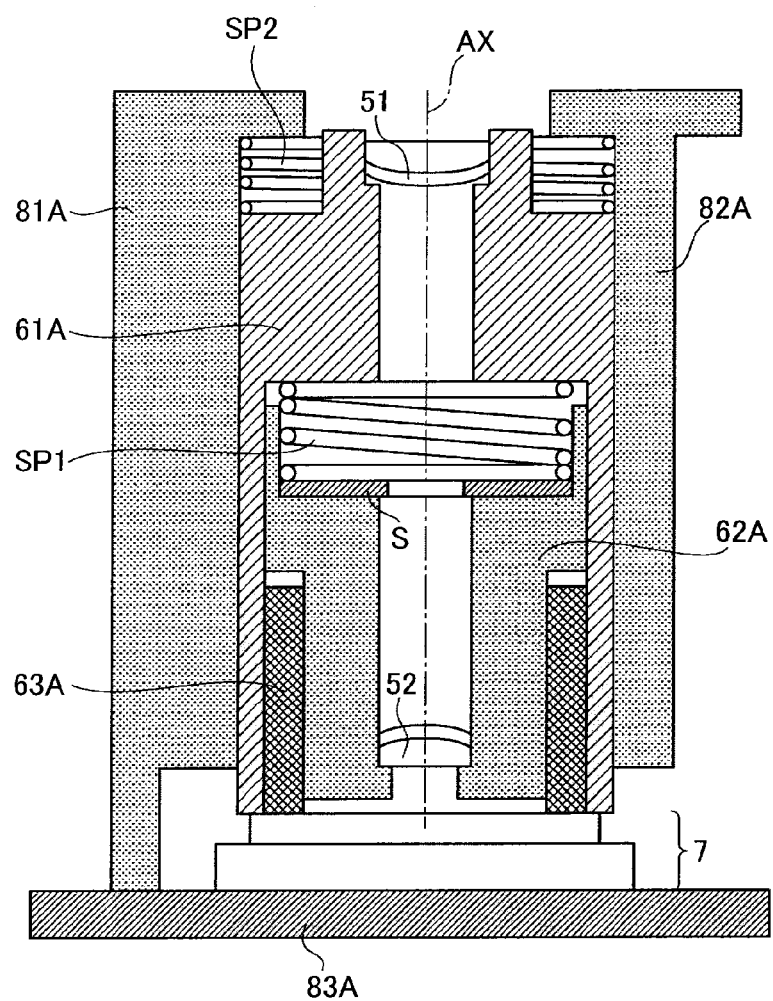
FIG. 10 is a diagram illustrating still another concrete example of the positional change measurement device.

A concrete example shown in FIG. 10 is a modification of the concrete example shown in FIG. 9, and a spring member SP2 being a compressive elastic member is placed in the space SP shown in FIG. 9.

Specifically, the spring member SP2 is placed between opposing surfaces of the first lens barrel 61A and of the housings 81A, 82A retaining the first lens barrel 61A.

The spring member SP2 is compressive, and therefore exerts an elastic force pressing the first lens barrel 61A downward in the direction along the axis AX.

The first lens barrel 61A is pressed against the image pickup device 7 by a force combining the downward elastic force exerted by the spring member SP2 and the upward elastic force exerted by the spring member SP1, the "downward" and "upward" being based on the directions in FIG. 10 (the same is true below).

The third lens barrel 63A is pressed against the image pickup device 7 by a force combining the downward elastic forces exerted by the spring members SP1 and SP2, respectively.

Thus, in the example in FIG. 10, the first lens barrel 61A and the third lens barrel 63A do not need to be fixed to the image pickup device 7 at their lower end portions in FIG. 10.

The concrete example shown in FIG. 10 also enables avoidance of the problem in which a desired amount of thermal change in the group interspace cannot be obtained because the first lens barrel 61A separates from the image pickup device 7 due to disturbance such as vibration.

When the two spring members SP1, SP2 are used as in the concrete example shown in FIG. 10, the first lens barrel 61A and the third lens barrel 63A only have to be pressed against the image pickup device 7, as described above.

In this case, the abutment between the image pickup device 7 and the first and third lens barrels 61A, 63A by the action of gravity can be ensured by appropriately setting the stiffness of each of the spring members SP1, SP2.

Note that the spring members SP1 and the spring member SP2 correspond to the spring member A and the spring member B, respectively, in claims 17 and 18.

The example described with reference to FIG. 10 is a case where the positional change measurement device is placed below the dynamic measured surface. The gravitational acceleration is denoted by G hereinbelow.

The masses of the first lens barrel 61A, the second lens barrel 62A, and the third lens barrel 63A are denoted by M1, M2, and M3, respectively.

Then, in each of the concrete examples described above, gravities M1G, M2G, and M3G are exerted downward (in the drawings) to the first lens barrel 61A, the second lens barrel 62A, and the third lens barrel 63A, respectively.

When an upward direction in each drawing is positive, a force exerted on the first lens barrel 61A is:

$$K1 \cdot n1 - K2 \cdot n2 - M1 \cdot G,$$

where K1 and n1 are the spring constant and the flexure amount, respectively, of the spring member SP1, and K2 and n2 are the spring constant and the flexure amount, respectively, of the spring member SP2.

In addition, a force exerted on the third lens barrel 63A is:

$$-K1 \cdot n1 - K2 \cdot n2 - M2 \cdot G - M3 \cdot G.$$

Since the combined force exerted on the first lens barrel 61A is directed downward in the drawings, the first lens barrel 61A does not separate from the image pickup device 7 as long as $$K1 \cdot n1 - K2 \cdot n2 - M1 \cdot G < 0. \quad (3)$$

In addition, the third lens barrel 63A does not separate from the image pickup device 7 as long as $$-K1 \cdot n1 - K2 \cdot n2 - M2 \cdot G - M3 \cdot G < 0. \quad (4)$$

Hence, the spring constant and the flexure amount of each of the spring members SP1, SP2 are set according to the masses M1 to M3 of the first to third lens barrels, so as to satisfy both of Formulae (3) and (4) described above.

Conversely, when the positional change measurement device is placed at a position higher than the dynamic measured surface, the image pickup device 7 is located at an uppermost position.

In this case, the first lens barrel 61A does not separate from the image pickup device 7 as long as $$-K1 \cdot n1 + K2 \cdot n2 - M1 \cdot G > 0. \tag{5}$$

In addition, the third lens barrel 63A does not separate from the image pickup device 7 as long as $$K1 \cdot n1 - M3 \cdot G > 0. \tag{6}$$

Hence, in this case, the spring constant and the flexure amount of each of the spring members SP1, SP2 are set according to the masses M1 to M3 of the first to third lens barrels, so as to satisfy both of Formulae (5) and (6) described above.

Figure 11A:
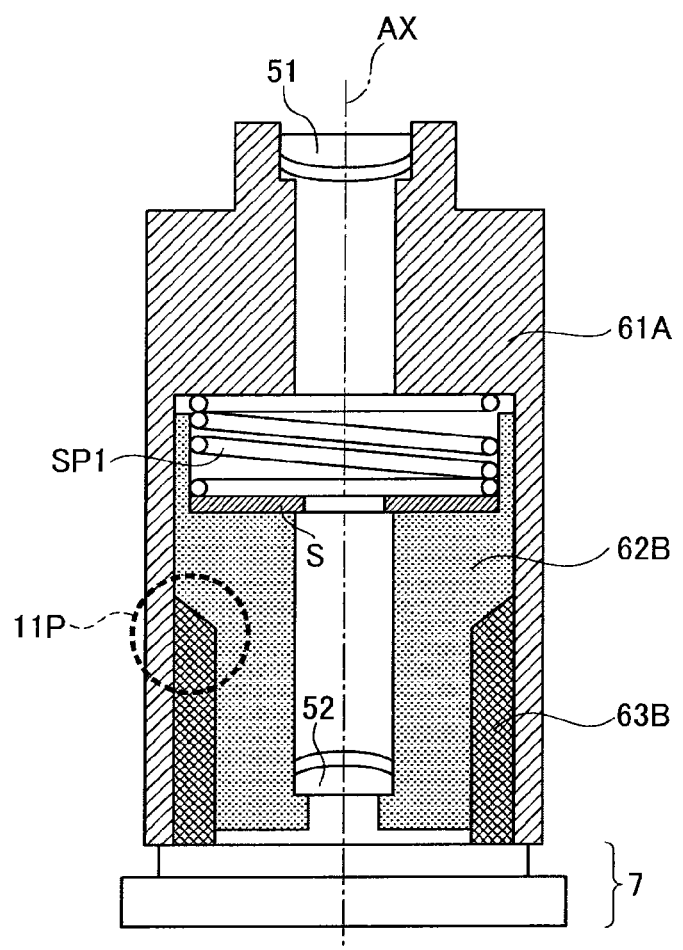
FIGS. 11A and 11B are diagrams illustrating still another concrete example of the positional change measurement device.
Figure 11B:
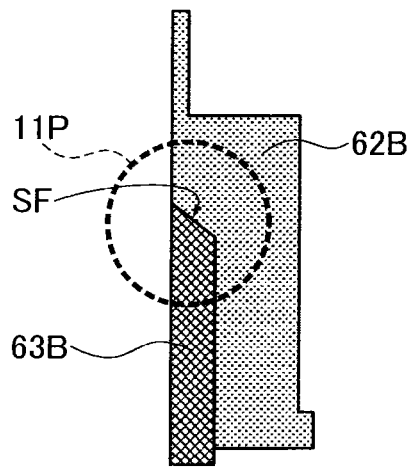

FIGS. 11A and 11B show another concrete example. A characteristic portion of the concrete example in FIGS. 11A and 11B can also be applied to the examples described with reference to FIGS. 4 and 7 to 10.

Elements in FIGS. 7 to 10 and their corresponding elements in FIGS. 11A and 11B are denoted by the same reference numerals.

In FIGS. 11A and 11B, a portion encircled by a broken line and indicated by reference numeral 11P is the characteristic portion.

Specifically, the concrete example shown in FIGS. 11A and 11B is characterized in that an abutment surface SF between a second lens barrel 62B and a third lens barrel 63B is slanted relative to the lens barrel axis AX (i.e., forms a conic surface).

For example, in the concrete example shown in FIG. 10, a surface along which the second lens barrel 62A and the third lens barrel 63A abut each other in the direction of the axis AX is a planar surface.

Thus, if the second lens barrel 62A and the third lens barrel 63A receive some factor displacing them in a direction parallel to this planar surface, displacement might occur.

Such displacement incurs displacement of the optical axis of the first group 51 and the second group 52, causing a change in the image-forming magnification.

As illustrated in FIGS. 11A and 11B, This problem can be avoided by making the abutment surface SF, along which the second lens barrel 62B and the third lens barrel 63B abut each other in the direction of the axis AX, slanted relative to the axis AX.

Thus, the slanted surface (conic surface) SF prevents the second lens barrel 62B and the third lens barrel 63B from being displaced in a direction orthogonal to the axis AX.

By abutting and being pressed against each other along the slanted surface SF, the second lens barrel 62B and the third lens barrel 63B can be aligned with respect to each other.

The abutment surface SF can be slanted in such a manner as to descend as it is located away from the axis AX.

Figure 12A:
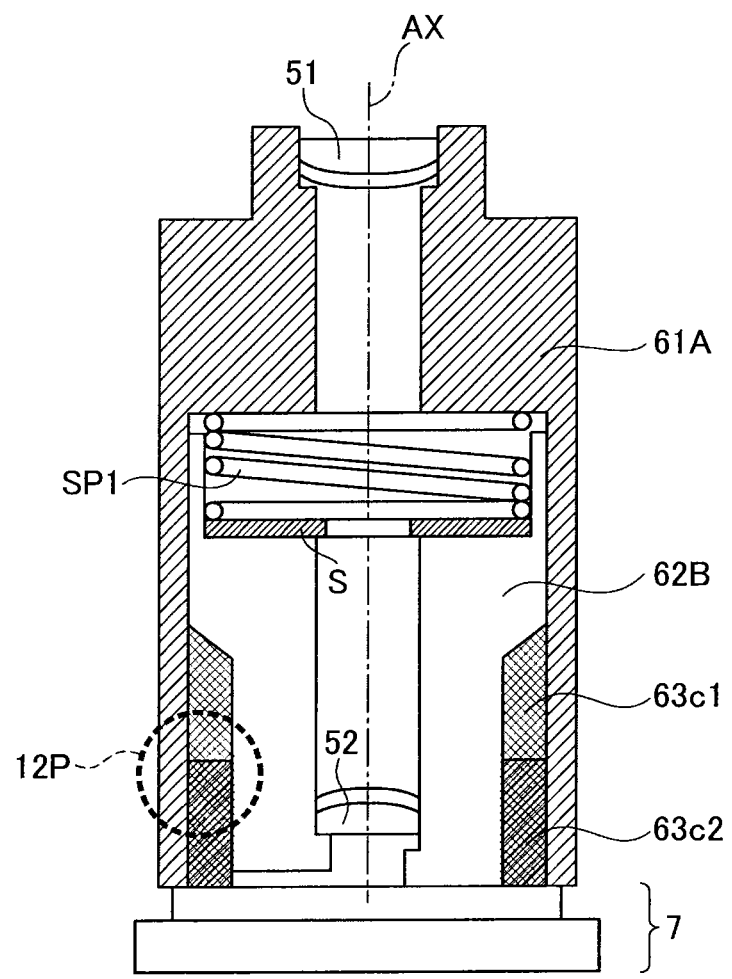
FIGS. 12A and 12B are diagrams illustrating still another concrete example of the positional change measurement device.
Figure 12B:
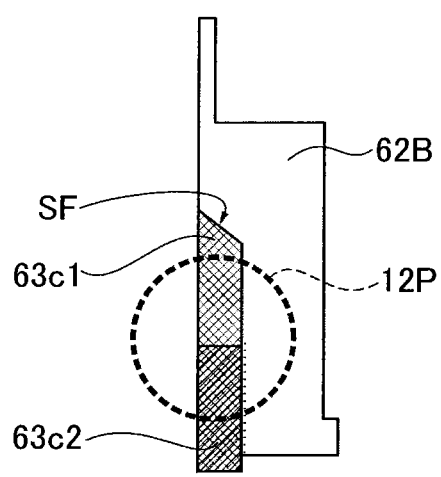

FIGS. 12A and 12B show another concrete example. A characteristic portion of the concrete example in FIGS. 12A and 12B can also be applied to the examples described with reference to FIGS. 4 and 7 to 11A, 11B.

In FIGS. 12A and 12B, the characteristic portion is applied to the concrete example of FIGS. 11A and 11B.

In FIGS. 12A and 12B, a portion encircled by a broken line and indicated by reference numeral 12P is the characteristic portion.

Specifically, the third lens barrel is sectioned into two portions 63c1, 63c2.

As described above, the first lens barrel, the second lens barrel, and the third lens barrel are made of materials having predetermined coefficients of linear expansion.

There might be a case where there are no appropriate materials having desired coefficients of linear expansion.

In such a case, the conditions can be satisfied by forming the lens barrel by a combination of two or more materials having different coefficients of linear expansion.

In the concrete example shown in FIGS. 12A and 12B, the third lens barrel is formed by two lens barrel portions 63c1, 63c2, and the coefficients of linear expansion of materials forming these lens barrel portions are denoted by β1, β2, respectively.

Further, Z31 and Z32 denote the lengths of the lens barrel portions 63c1 and 63c2, respectively, and Δ30 denotes an amount of change in the length of the third lens barrel necessary to cope with a change ΔT in the measurement environment temperature.

In this case, Z31 and Z32 described above are set according to the coefficients of linear expansion β1 and β2, so as to satisfy:

$$\Delta 30 = (\beta 1 \cdot Z31 + \beta 2 \cdot Z32) \Delta T.$$

Of course, not only the third lens barrel, but also the first lens barrel 61A and/or the second lens barrel 62A may be formed by connecting, in the direction of the lens barrel axis, two or more lens barrel portions having different coefficients of linear expansion.

The imaging optical system has an aperture stop, as described above.

During positional change measurement of a dynamic measured surface, fluctuations in the reflectivity or the positional change velocity of the dynamic measured surface change the contrast in the speckle patterns acquired.

Since such fluctuations in the contrast of the speckle patterns affect the accuracy of the measurement, the speckle patterns acquired should preferably have favorable contrast.

In a speckle pattern having favorable contrast, a ratio of a bright section to a dark section is about 1:1.

Figure 13:
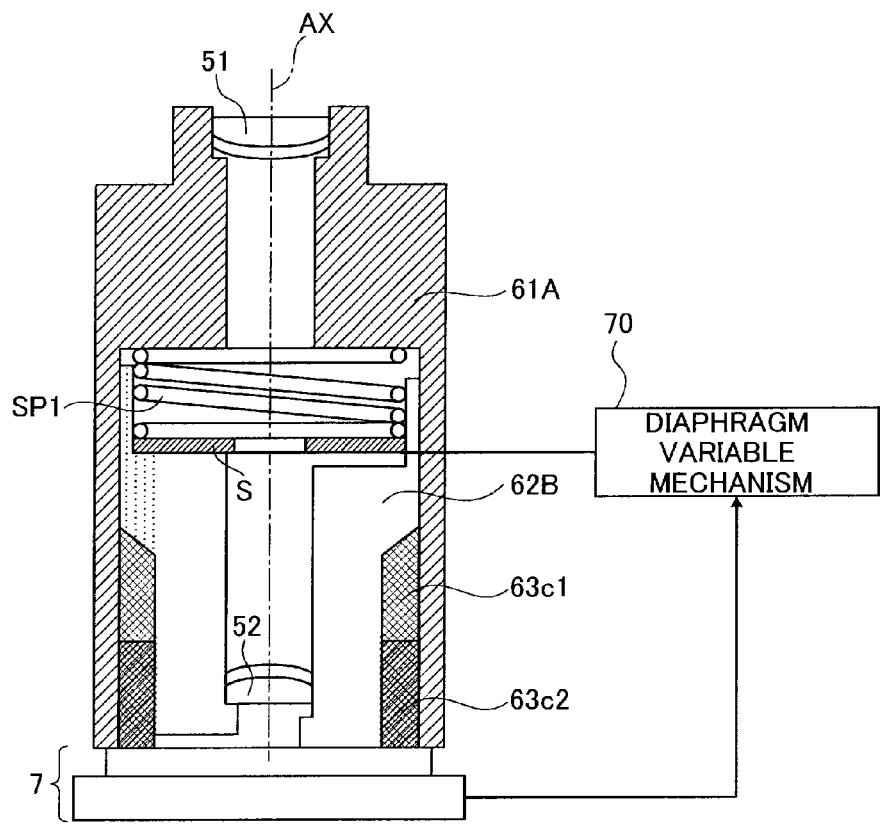
FIG. 13 is a diagram illustrating still another concrete example of the positional change measurement device.

The above described problem is addressed in a concrete example shown in FIG. 13.

Specifically, this concrete example has a diaphragm variable mechanism 70.

The diaphragm variable mechanism 70 is configured to detect a signal indicating the luminance of an acquired speckle pattern based on output of the image pickup device 7, and adjust the aperture of the aperture stop S according to a change in the luminance.

This adjustment is preferably performed by detecting a luminance distribution and controlling the aperture to cancel out a change in the luminance distribution.

Such adjustment can achieve stable contrast.

However, the adjustment is not limited to this, and may be such that the diaphragm is controlled to be changed by one level when the amount of change in the luminance distribution exceeds a predetermined threshold.

Various conventionally-known mechanisms can be used as the mechanism for changing the aperture of the aperture stop S.

Considering the configuration of the lens barrel portions and the size of the imaging optical system, it is preferable to form the aperture stop S with a liquid crystal filter, configure the mechanism such that the aperture stop S can be changed in its size in a stepwise manner, and change the size of the aperture electrically according to the amount of change in the luminance distribution.

Using a positional change measurement device having the imaging optical system described in Example 1, positional change measurement was performed on a surface of a sticking sheet for printing attached to a linear stage, as a dynamic measured surface.

The dynamic measured surface was moved 50 mm at a linear velocity of 100 mm/second and measured for its traveled distance, i.e., a detected length.

The positioning accuracy of the linear stage was 0.2 μm, and an error for feeding the sheet 50 mm was 0.0004%.

As described earlier, an error range of the positional change measurement device of Example 1 is about +0.008% to −0.005%.

After successive measurements, it was confirmed that an error range fell within the above-described range irrespective of fluctuations in the measurement-environment; therefore, an influence of the fluctuations in the measurement environment temperature was effectively suppressed.

The following positional change measurement method can be implemented by using the positional change measurement device of the embodiments and Example 1 described above.

Specifically, in this positional change measurement method, the dynamic measured surface is illuminated, at the predetermined position, with illumination light (which is coherent light) emitted by the illuminating optical system having the laser light source and the coupling lens.

Then, reflection light from the dynamic measured surface is guided, via the imaging optical system, to the image pickup device, and speckle patterns of the dynamic measured surface are acquired at a predetermined frame rate.

Cross-correlation computation is performed on the speckle patterns acquired at predetermined time intervals, and based on a result of this computation, at least one of the traveled distance and the traveling velocity of the dynamic measured surface is measured.

The positional change measurement device of the embodiments and Example 1 described above can be used in an image forming apparatus configured to form an image on a surface of a mobile object moving in a constant direction at a constant velocity, to measure at least one of the traveled distance and the traveling velocity of the surface of the mobile object as a dynamic measured surface.

This image forming apparatus can be one employing an electrophotographic process, in which electrostatic latent images are formed on photoconductive, photosensitive bodies, the electrostatic latent images are made visible as toner images, and the toner images are transferred to a transfer-receiving body.

In this case, using the transfer-receiving body as a mobile object, the positional change measurement device measures at least one of the traveled distance and the traveling velocity of the surface of the mobile object.

As described above, the positional change measurement device of the present invention can achieve stable positional change measurement whose fluctuations in the detected length caused by a change in the measurement environment temperature are considerably small.

Thus, the positional change measurement device of the present invention may be used in an inkjet or electrophotographic color image forming apparatus, as a sensor for controlling the velocity of sheet conveyance or the velocity of an intermediate transfer belt or the like.

Since the positional change measurement is performed using speckle patterns, the positional change measurement device of the present invention can perform the measurement on any dynamic measured surface being a measurement target, as long as the dynamic measured surface has minute asperities.

Since the measurement requires speckle patterns, no marking of encoder patterns on the measurement target is necessary, which allows a wide range of measured objects.

Further, in the embodiments described above, the measurement target is a detected length having a length dimension. However, velocity information can also be obtained by performing time differentiation on the measured length.

Furthermore, velocity fluctuations in a minute period of time can also be obtained by appropriately selecting a frame rate for acquiring speckle patterns.

Fluctuations in the detected length due to temperature can be reduced also for models having different dimensional configurations, by performing optimization according to a method similar to that in the above embodiments.

Figure 6:
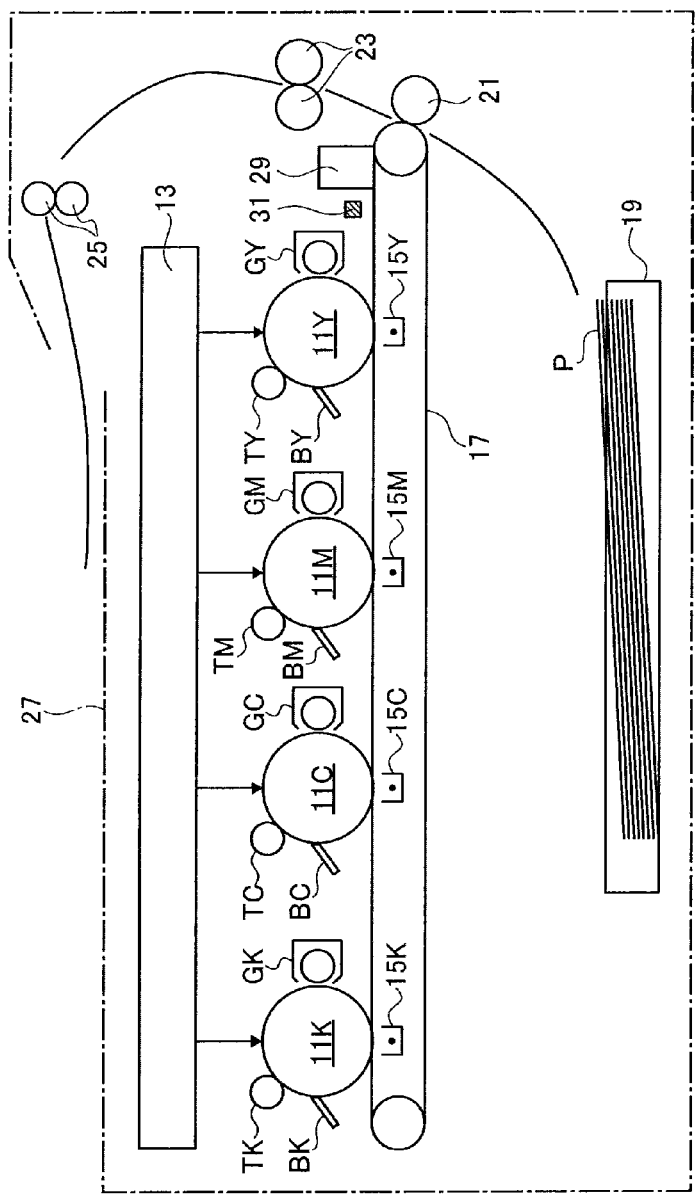
FIG. 6 is a diagram illustrating one embodiment of an image forming apparatus.

FIG. 6 shows one embodiment of a color image forming apparatus using the positional change measurement device.

This color image forming apparatus employs a tandem system using an electrophotographic process, and has four photosensitive bodies 11Y, 11M, 11C, and 11K arranged in line.

Letters Y, M, C, and K after reference numeral 11 indicates the color of toner for forming a toner image. Specifically, Y indicates yellow, M indicates magenta, C indicates cyan, and K indicates black.

The photosensitive bodies 11Y to 11K are photoconductive and drum-shaped.

Surrounding the photosensitive bodies 11Y to 11K, charging rollers TY to TK, developing devices GY to GK, transfer chargers 15Y to 15K, and cleaners BY to BK are provided, respectively.

An intermediate transfer belt denoted by reference numeral 17 is placed under the photosensitive drums 11Y to 11K with its surface close to the photosensitive drums 11Y to 11K.

In FIG. 6, reference numeral 13 denotes an image writing device employing optical scanning, 19 denotes a sheet cassette, 21 denotes transfer rollers, 23 denotes a fixing device, and 25 denotes ejection rollers.

In addition, reference numeral 27 indicates an exterior part, 29 denotes a belt cleaning device, and 31 denotes a positional change measurement device.

Color image formation is briefly described.

When image formation is started, the photosensitive bodies 11Y to 11K rotate clockwise at a constant velocity at predetermined timing.

The photosensitive bodies 11Y to 11K are evenly charged by their corresponding charging rollers TY to TK.

By optical scanning performed by the image writing device 13, electrostatic latent images are written on the respective evenly-charged photosensitive bodies, are developed, and are made visible as toner images of different colors.

Specifically, the image writing device 13 writes an image of a yellow image component onto the photosensitive body 11Y, and the developing device GY develops an electrostatic latent image thus formed on the photosensitive body 11Y, forming a yellow toner image thereon.

The image writing device 13 writes an image of a magenta image component onto the photosensitive body 11M, and the developing device GM develops an electrostatic latent image thus formed on the photosensitive body 11M, forming a magenta toner image thereon.

The image writing device 13 writes an image of a cyan image component onto the photosensitive body 11C, and the developing device GC develops an electrostatic latent image thus formed on the photosensitive body 11C, forming a cyan toner image thereon.

The image writing device 13 writes an image of a black image component onto the photosensitive body 11K, and the developing device GK develops an electrostatic latent image thus formed on the photosensitive body 11K, forming a black toner image thereon.

The toner images thus formed in different colors on the respective photosensitive bodies 11Y to 11K are transferred to the intermediate transfer belt 17.

As a transfer-receiving body, the intermediate transfer belt 17 is driven to rotate in a constant direction, i.e., leftward in FIG. 6, at a constant velocity in accordance with the rotational surface velocity of the photosensitive bodies 11Y to 11K.

Then, the transfer charger 15Y transfers the yellow toner image from the photosensitive body 11Y to the intermediate transfer belt 17, and the transfer charger 15M transfers the magenta toner image from the photosensitive body 11M to the intermediate transfer belt 17.

Similarly, the transfer changer 15C transfers the cyan toner image from the photosensitive body 11C to the intermediate transfer belt 17, and the transfer charger 15K transfers the black toner image from the photosensitive body 11K to the intermediate transfer belt 17.

The toner images of the different colors thus transferred are superimposed on one another on the intermediate transfer belt 17 and thereby form a color toner image.

A transfer sheet P onto which this color toner image is to be transferred is fed from the sheet cassette 19 located below the intermediate transfer belt 17 to a transfer section.

Then, in the transfer section, the color toner image on the intermediate transfer belt 17 is transferred onto the transfer sheet P when the transfer sheet P is nipped and conveyed by the intermediate transfer belt 17 and the transfer rollers 21. Then, the transfer sheet P is conveyed to the fixing device 23.

The fixing device 23 fixes the color toner image on the transfer sheet P, and the ejection rollers 25 eject the transfer sheet P to a tray formed as an upper portion of the exterior part 27.

The belt cleaning device 29 removes residual toner and paper dust on the intermediate transfer belt 17 from which the color toner image has been transferred to the transfer sheet P.

The intermediate transfer belt 17 needs to pass transfer positions at a predetermined velocity and timing, the transfer positions being positions at which the toner images of the different colors are to be transferred to the intermediate transfer belt 17. Thus, the traveling velocity of the intermediate transfer belt 17 needs to be controlled with high accuracy.

The positional change measurement device 31 is configured to accurately measure the traveling velocity of the surface of the intermediate transfer belt 17 travelling to the transfer positions at which the toner images are to be transferred thereto from the respective photosensitive bodies.

Then, based on the measured traveling velocity, control driving means (not shown) controls the traveling velocity of the intermediate transfer belt 17 so that the intermediate transfer belt 17 may move at a constant velocity.

The positional change measurement device 31 is the one according to any one of the embodiments and Example 1 described above, and configured to accurately measure the traveling velocity of the surface of the intermediate transfer belt 17 as the dynamic measured surface.

The toner images of different colors are thus properly transferred to form a color image with no color misalignment.

When the amount of fluctuations in the detected length is as small as $-1.54\times10^{-6}$(%) as in Example 1, it is possible to obtain a favorable color image with no color misalignment even by a high-speed image forming apparatus capable of printing, for example, 60 color images per minute.

Although the surface of the intermediate transfer belt is used as the dynamic measured surface above, the positional change measurement device described above can of course measure the positional change of the surface of each photosensitive body.

Further, although reflection light from the dynamic measured surface is used as detection light above, the detection light may be transmitted light, of course.

In addition, FIGS. 1A-1B, 2, 4, and 5 are all provided for illustrative purposes, and do not necessarily show accurate f-numbers and other optical values of actual optical systems.

Example 2

Patent Document 1, for example, proposes a method for correcting the driven amount (positional change in a conveyance direction or a thrust direction) of a transfer belt or the like by irradiating a belt surface of the transfer belt or the like with laser light, detecting a speckle image pattern thereby produced on the belt surface, and analyzing the detected pattern.

In addition, Patent Document 2 proposes a method for controlling the drive of a transfer belt or the like by using a two-dimensional image sensor to detect a speckle image pattern produced when a recording medium (such as a sheet of paper) is irradiated with laser light and analyzing the detected pattern.

Patent Document 3 proposes a method for obtaining the drive speed of a transfer belt or the like by analyzing correlations among speckle images detected at certain time intervals by irradiating a belt surface of the transfer belt or the like with laser light and forming an image of scattering light onto an area sensor via an image-forming lens. If the transfer belt or the like thrusts in a direction perpendicular to the belt surface, the detected speckle image appear to shift in a direction parallel to the belt surface. To avoid a detection error caused by that shift, the area sensor is placed in the direction perpendicular to the belt surface.

However, none of Patent Documents 1 to 3 mentions a detection error in the drive amount of the transfer belt or the like, which error is caused by e.g. thermal expansion of components of a multicolor image forming apparatus due to fluctuations in a temperature inside the multicolor image forming apparatus.

Thus, Example 2 aims to drive the transfer belt or the like with high accuracy irrespective of fluctuations in the temperature inside the multicolor image forming apparatus.

Figure 14:
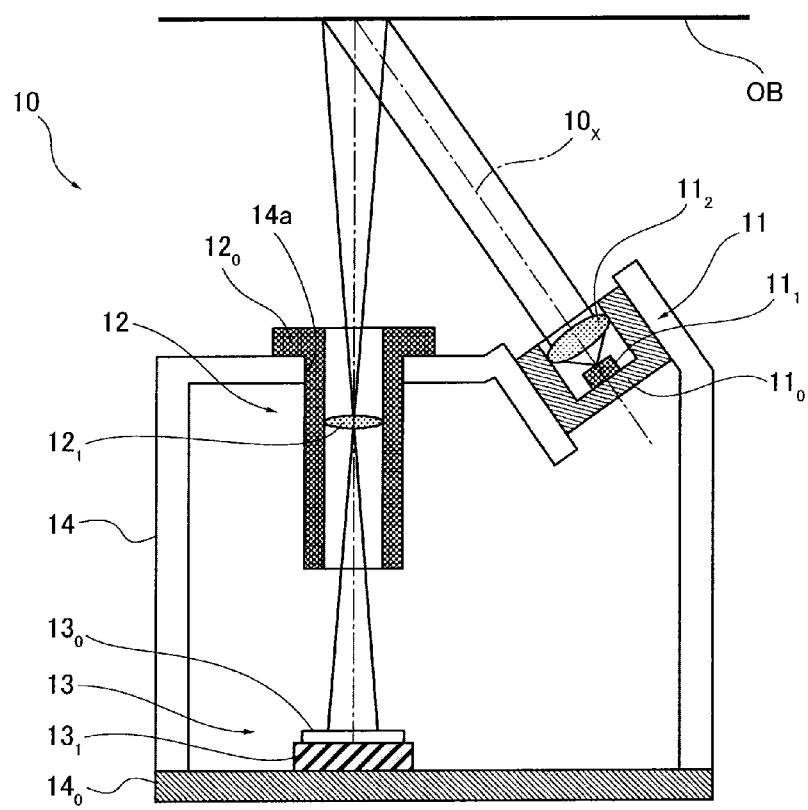
FIG. 14 is a diagram showing the configuration of a positional change detector according to Example 2.

FIG. 14 shows the configuration of a positional change detector 10 according to Example 2. The positional change detector 10 includes an illuminating optical system 11, an imaging optical system 12, an optical sensor 13, a casing 14, and the like. Note that a transfer belt or the like the velocity of which is to be detected, such as a conveyer belt (including a recording medium conveyed by the conveyer belt) or an intermediate transfer belt is expressed as a measured object OB.

The illuminating optical system 11 includes a light source $11_1$ and a coupling lens $11_2$. The light source $11_1$ is fixed to a bottom surface of a cylindrical support member $11_0$, and the coupling lens $11_2$ is fixed inside a body portion of the cylindrical support member $11_0$. The cylindrical support member $11_0$ is fixed between a slanted-surface portion of an inwardly-bent upper surface of the casing 14 and a tip-end portion of a side surface of the casing 14 bent into a hook, with an opening of the cylindrical support member $11_0$ facing the measured object OB. The light source $11_1$ includes, for example, a laser diode, and emits substantially-parallel detection light toward the measured object OB through the coupling lens $11_2$. In FIG. 14, an optical axis $10x$ of the detection light is shown with a dashed-dotted line. The detection light thus enters the measured object OB and irradiates a lower surface thereof.

The imaging optical system 12 includes an imaging lens $12_1$, and is placed immediately below the measured object OB (at an area irradiated by the detection light). The imaging lens $12_1$ is retained inside a body portion of a cylindrical retaining member (lens barrel cell) $12_0$. The lens barrel cell $12_0$ has an upper end portion whose outer diameter is larger than that of the body portion. The vertical position of the lens barrel cell $12_0$ is set when the body portion thereof is inserted from above through a circular opening 14a provided at the upper surface of the casing 14 and the upper end portion thereof is brought into contact with an edge portion of the opening 14a. The lens barrel cell $12_0$ is thus fixed to the casing 14. Light scattering from the lower surface of the measured object OB by the irradiation of the detection light described above is guided to an optical sensor 13 by being converged by the imaging optical system 12. Thereby, an image of the measured object OB is formed on a light-receiving surface of the optical sensor 13.

The optical sensor 13 includes a sensor body (e.g., a CMOS sensor) $13_1$. The sensor body $13_1$ is fixed onto a bottom plate (substrate) $14_0$ of the casing 14, and the light-receiving surface thereof is covered by a covering glass $13_0$. The optical sensor 13 captures an image of the measured object OB (one-dimensional or two-dimensional image) at a certain frame rate. Results of the imaging are sent to an analysis device (not shown).

The measured object OB such as a transfer belt is microscopically irregular at the scale of the wavelength of the detection light. Thus, scattering light produced by irradiation of coherent detection light exhibits a clear irregular pattern (called a speckle pattern). When the measured object OB moves, the speckle pattern also moves without any change in its form. Thus, the positional change of the measured object OB can be detected based on the imaging results of the stable pattern.

The analysis device (not shown) performs correlation computation on the imaging results of the speckle patterns (also called simply a speckle image) received sequentially from the optical sensor 13 to find a temporal change in at least two speckle image patterns captured at different times for example, and thereby obtains the positional change of the measured object OB. (The traveling velocity of the measured object OB can be derived by dividing the obtained positional change by an inverse number of the frame rate.) A result of this is sent to a control device (not shown), which then controls a driving device (not shown) according to the result to drive the transfer belt or the like with high accuracy.

In the positional change detector 10 having the configuration described above, the support member $11_0$, the lens barrel cell $12_0$, the casing 14, and the like expands to stretch (or contracts) due to a factor such as heat produced by the optical sensor 13 (the sensor body $13_1$) or a change in an environmental temperature. Consequently, the imaging lens $12_1$ supported by the lens barrel cell $12_0$ shifts in position in a direction parallel to the optical axis 10x (called an optical-axis direction herein) and moves toward (or away from) the measured object OB. Such a shift changes the values of parameters M, D, and Db in Formula (1) given later, causing a detection error in the positional change of the measured object OB.

As an example, assume a case where the magnification (M) of the imaging optical system 12 is 0.8 and the casing 14 is made of aluminum and 30 mm high. Under an environmental temperature of 25° C., it is estimated that the amount of positional change (called a detected length) of the measured object OB has an error of about 50 μm, when considering displacement of the imaging lens $12_1$ due only to the heat produced by the optical sensor 13 (sensor body $13_1$).

Here, the detection accuracy of the positional change detector 10 (suppress a detection error due to temperature) is optimized by optimizing the optical characteristics, or in particular the focal length, of the imaging optical system 12.

From Non-patent Document 1, a relation:

$$V2/V1 = M\{(D/Db)-1\} \quad (1)$$

holds true, where V1 is the positional change velocity (translational velocity) of the measured object OB, V2 is the translational velocity of a speckle image detected by the optical sensor 13, M is the image-forming magnification of the imaging optical system 12, D is a distance between a plane of an image of the measured object OB obtained by the imaging lens $12_1$ and the light-receiving surface of the optical sensor 13 (the sensor body $13_1$), and Db is a distance between the image plane of the measured object OB and an image plane of the light source $11_1$. However, it is unclear from the relational expression (1) how the optical characteristics, such as a focal length, of the imaging lens $12_1$ affect the velocity ratio V2/V1. Moreover, an error in the detected length due to temperature cannot be derived from the relational expression (1), either.

Thus, the inventors analyzed, based on optical principles (or an image forming theory in particular), how the velocity ratio V2/V1 is affected by the optical characteristics of the imaging lens $12_1$. For example, the parameter M is obtained by deriving a distance between the imaging lens $12_1$ and the image plane of the measured object OB (i.e., an image distance) from an optical image formation formula, by using a distance between the measured object OB and the imaging lens $12_1$ (i.e., an object distance) and a focal length (f) of the imaging lens $12_1$. Moreover, the parameter D is obtained by deriving a distance between the imaging lens $12_1$ and the light-receiving surface of the optical sensor 13. In addition, the parameter Db is obtained from the positions of the light source $11_1$ and the coupling lens $11_2$ and the position of the imaging lens $12_1$. Thermal structure coupled simulation was used to obtain displacements of the imaging lens $12_1$, the optical sensor 13, the light source $11_1$, and the coupling lens $11_2$ due to expansion and stretch of the casing 14 and/or the like caused by heat produced by the optical sensor 13 (the sensor body $13_1$), a change in the environmental temperature, or the like. Additionally, a change in the focal length (f) of the imaging lens $12_1$ due to a temperature change is also obtained. Based on these results, changes in the parameters M, D, and Db and a change in the detected length were analyzed.

Figure 15:
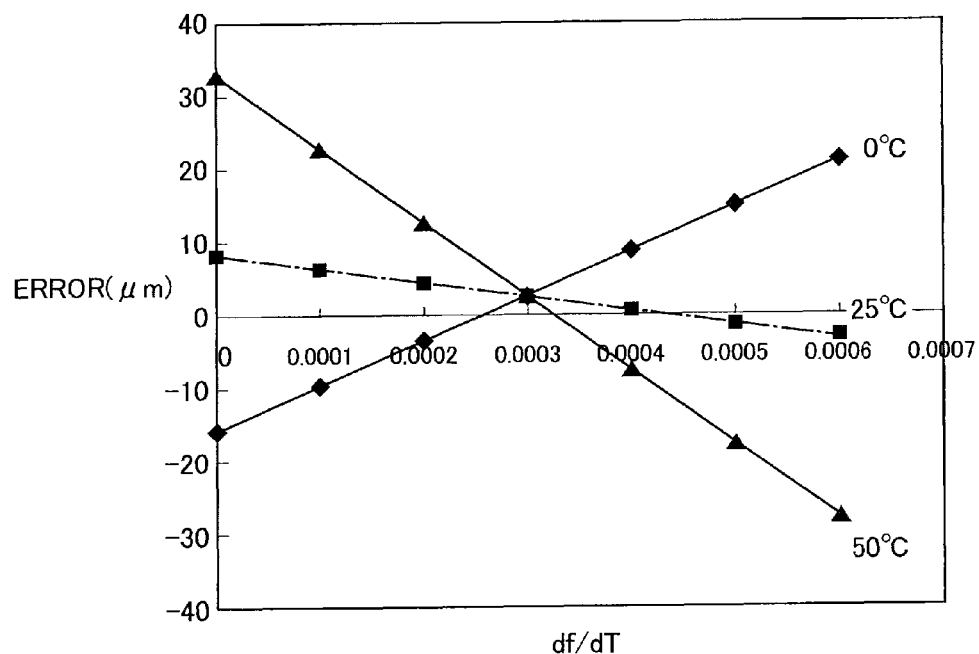
FIG. 15 is a diagram showing an error in a detected length due to temperature, with respect to a temperature fluctuation coefficient df/dT.

As a result, it was found that an error in the detected length due to temperature (error due to temperature) was proportional to, in a good approximation, a change in the focal length f of the imaging lens $12_1$ due to a temperature change dT (this change being called a temperature change rate or temperature fluctuation coefficient df/dT hereinbelow). FIG. 15 shows results of analysis under the environmental temperatures of 0° C., 25° C., and 50° C. When the temperature fluctuation coefficient df/dT increased, the error due to temperature in the detected length drastically decreased under the environmental temperature of 0° C., gently decreased under the environmental temperature of 25° C., and drastically increased under the environmental temperature of 50° C. The three straight lines intersect almost at a single point near the temperature fluctuation coefficient df/dT=0.0003. This implies that (the error due to temperature of) the detected length can be maintained constant independent of temperature by optimizing the value of the temperature fluctuation coefficient df/dT to that value, namely, 0.0003.

For example, in a case where the lens barrel cell $12_0$ is made of SUS 430 which is a type of ferritic stainless steel and where the df/dT value is 0.00031, an error due to temperature of 3.1 μm is obtained for the detected length of 50 mm under the environmental temperatures of 0° C. to 50° C. This corresponds to a detection accuracy of 0.0062%. Hence, by using the df/dT value as an index, the error due to temperature in the detected length can be suppressed to improve the detection accuracy.

A specific method for optimizing the df/dT value is discussed. Conceivable methods for the optimization include optimizing a temperature fluctuation coefficient dN/dT of a refractive index N of a glass material selected for the imaging lens $12_1$, optimizing the curvature of a lens surface of the imaging lens $12_1$, and the like. However, practically, the kinds of glass materials are finite, and therefore the dN/dT value is optimized only discretely. Moreover, optimization of the curvature of the lens surface is not necessarily easy. Thus, in Example 2, the df/dT value is optimized by configuring the imaging optical system 12 with two imaging lenses $12_1$, i.e., by combining two glass materials.

Figure 16:
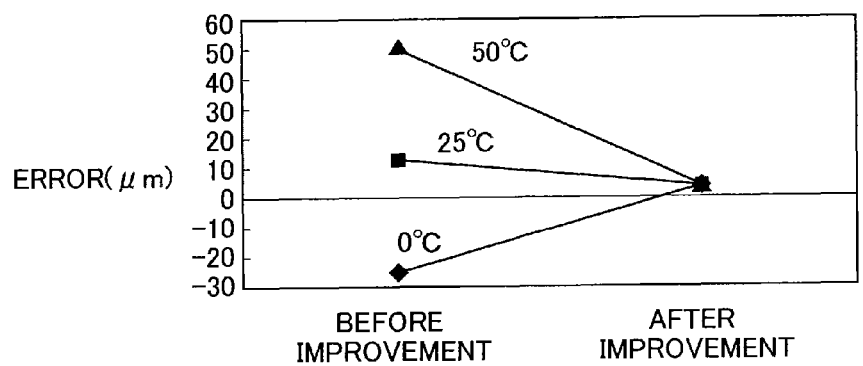
FIG. 16 is a diagram showing how an error in the detected length due to temperature is improved by optimizing glass materials of an imaging lens.

As shown in FIG. 16, for example, the optimum value of the df/dT value, 0.00031, is obtained by using a doublet lens for the imaging optical system 12 to have a focal length of 12.5 mm and an image-forming magnification of 0.80 and selecting SPHM53 as a glass material for an object-side lens of the doublet lens and STIM39 as a glass material for the image-side lens of the doublet lens. An error due to temperature of 4.4 μm is obtained with respect to a detected length of 50 mm, under the environmental temperatures of 0° C. to 50° C. If, as a comparative example, SBAL35 is selected as a glass material for the object-side lens and STIM25 is selected as a glass material for the image-side lens, the df/dT value obtained is −0.00007 and an error due to temperature of −24 μm to 50 μm is obtained with respect to a detected length of 50 mm, under the environmental temperatures of 0° C. to 50° C.

The df/dT value may be optimized by configuring the imaging optical system 12 with not only two but also more than two imaging lenses $12_1$, i.e., by combining more than two glass materials. This offers greater flexibility to the optimization, reduces cost, and allows more continuous optimization of the df/dT value.

As described in detail above, in the positional change detector 10 of Example 2, the temperature change rate (the df/dT value) in the focal length (f) of the imaging optical system 12 (the imaging lens $12_1$) is optimized to compensate for an error in the detected length caused by changes in the parameters M, D, and Db in Formula (1) due to temperature and therefore due to thermal expansion of the casing 14 and the like. Thereby, fluctuations in the detected length caused by temperature fluctuations can be suppressed, enabling accurate measurement of the positional change of the transfer belt or the like and accurate driving of the transfer belt or the like by using the measurement result.

Moreover, by configuring the positional change detector 10 by using the df/dT value as an index, fluctuations in the detected length caused by temperature fluctuations can be readily minimized without complicated configuration of the positional change detector 10.

Since the remaining error (e.g., the error due to temperature of 4.4 μm after the improvement in FIG. 16) does not depend on the environmental temperature, this error can be corrected readily by adjusting the position of the lens barrel cell $12_0$ (imaging lens $12_1$) or of the optical sensor 13 (the sensor body $13_1$). Alternatively, this remaining error can also be corrected by adding an offset value to a detection result obtained by the positional change detector 10.

Further, although the positional change detector 10 of Example 2 can minimize the fluctuations in the detected length caused by temperature fluctuations, for a configuration in which the focal length of the imaging optical system 12 (the imaging lens $12_1$) elongates when the environmental temperature increases, the fluctuations in the detected length caused by temperature fluctuations can similarly be minimized for a configuration in which the focal length shortens when the environmental temperature increases.

Example 3

Like Example 2, Example 3 aims to drive a transfer belt or the like with high accuracy irrespective of fluctuations in the temperature inside a multicolor image forming apparatus.

Example 3 is described below using FIG. 17. Note that elements similar to those in Example 2 are denoted by the same reference numerals, and are not described again here.

Figure 17:
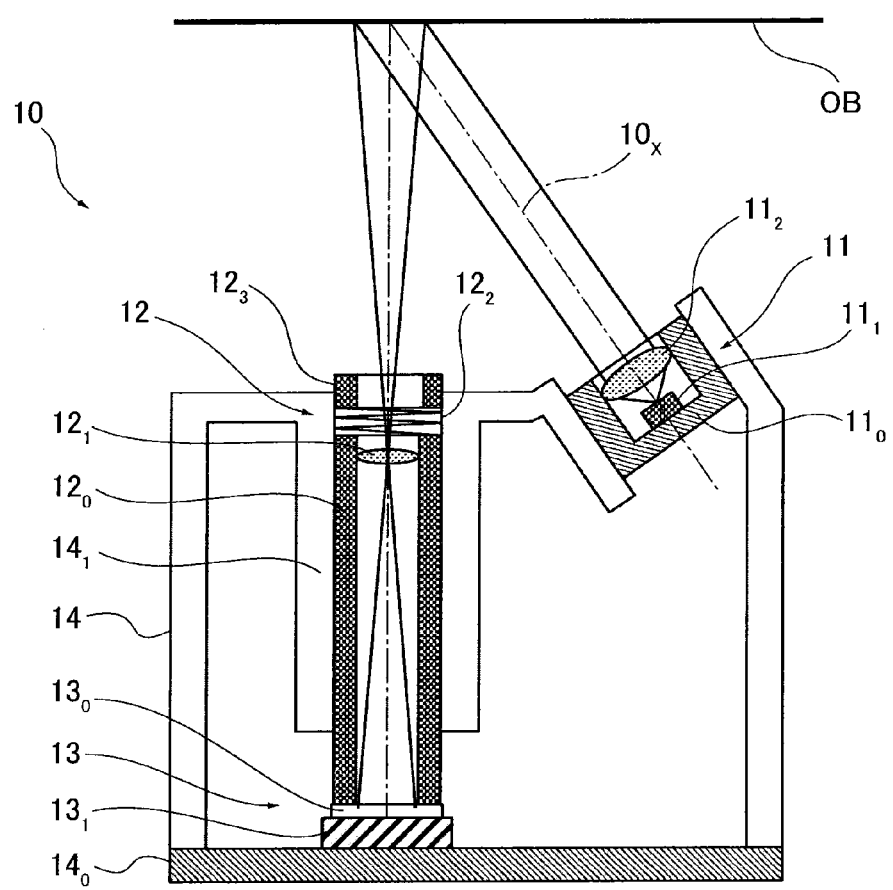
FIG. 17 is a diagram showing the configuration of a positional change detector according to Example 3.

FIG. 17 shows the configuration of the positional change detector 10 according to Example 3.

A cylindrical sliding retaining portion $14_1$ extends from the upper surface of the casing 14 to the inside of the casing 14, and the lens barrel cell $12_0$ is retained inside the sliding retaining portion $14_1$. Although, in FIG. 17, an outer surface of the lens barrel cell $12_0$ is in contact with an inner surface of the sliding retaining portion $14_1$, the lens barrel cell $12_0$ is movable in an extension direction of the sliding retaining portion $14_1$ (the optical-axis direction).

To set the position of the lens barrel cell $12_0$ (the imaging lens $12_1$) in the optical-axis direction, a lower end of the lens barrel cell $12_0$ is brought into contact with the optical sensor 13 (the cover glass $13_0$), an elastic member such as a spring is provided on an upper end of the lens barrel cell $12_0$ as a press member $12_2$, and a fastener $12_3$ is fitted into an opening of the sliding retaining portion $14_1$ to press the lens barrel cell $12_0$ (the imaging lens $12_1$) against the optical sensor 13 by the press member $12_2$.

Although the lens barrel cell $12_0$ may expand to stretch in the optical-axis direction due to a factor such as heat produced by the optical sensor 13 (the sensor body $13_1$) or a change in the environmental temperature, such expansion and stretch are independent of expansion and stretch of the casing 14. The height of the casing 14 (from the bottom surface to the upper surface) is smaller than the distance from the bottom surface to the imaging lens $12_1$. Thus, even if the casing 14 and the lens barrel cell $12_0$ are made of the same material, the displacement amount of the imaging lens $12_1$ caused by a change in the environmental temperature is small. The displacement amount of the imaging lens $12_1$ can be further reduced by forming the lens barrel cell $12_0$ with a material having a small coefficient of expansion (such as, e.g., SUS).

If, for example, the casing 14 is made of a resin material and the lens barrel cell $12_0$ is made of SUS which is a type of ferritic stainless steel, the errors due to temperature in the detected length under the environmental temperatures of 0° C. to 50° C. can each be suppressed to about 4 μm by appropriately selecting a glass material for the imaging lens $12_1$.

As described in detail above, according to the positional change detector 10 of Example 3, the lens barrel cell $12_0$ (the imaging lens $12_1$) is set in position in the optical-axis direction by being pressed inside the sliding retaining portion $14_1$ by the press member $12_2$ against the optical sensor 13. Since this decreases the distance by which the imaging lens $12_1$ and the optical sensor 13 are separated from each other due to the displacement of the casing 14 or the like caused by temperature fluctuations, fluctuations in the detected length caused by the temperature fluctuations can be suppressed. This consequently enables accurate measurement of the positional change of the transfer belt or the like and accurate driving of the transfer belt or the like by using the measurement result.

Example 4

Like Examples 2 and 3, Example 4 aims to drive a transfer belt or the like with high accuracy irrespective of fluctuations in the temperature inside a multicolor image forming apparatus.

Example 4 is described below using FIG. 18. Note that elements similar to those in Examples 2 and 3 are denoted by the same reference numerals, and are not described again here.

Figure 18:
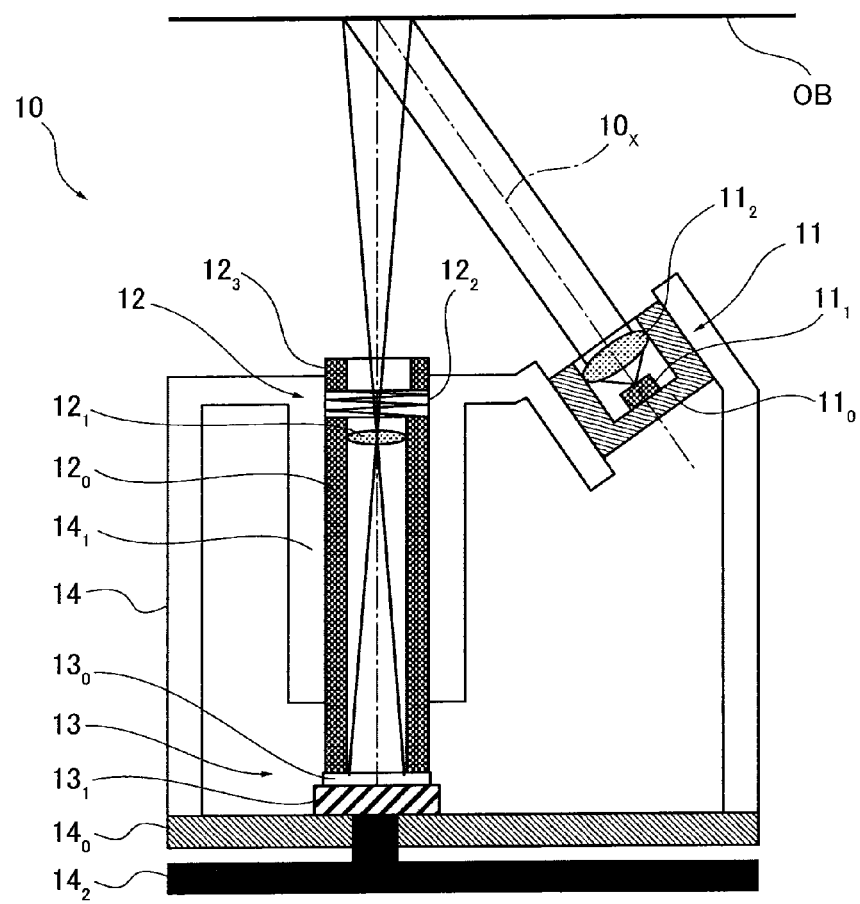
FIG. 18 is a diagram showing the configuration of a positional change detector according to Example 4.

FIG. 18 shows the configuration of the positional change detector 10 according to Example 4.

A heat releasing member (radiator plate) $14_2$ is placed outside the casing 14, and is in contact with the back surface of the optical sensor 13 (the sensor body $13_1$) through a through-hole provided in the bottom surface (substrate $14_0$) of the casing 14. Thereby, the radiator plate $14_2$ functions as a heatsink to release heat produced by the optical sensor 13 (the sensor body $13_1$) to the radiator plate $14_2$, i.e., to the outside of the casing 14. Displacement of the casing 14 or the like due to temperature change is thereby suppressed.

When the optical sensor 13 (the sensor body $13_1$) was driven under the environmental temperature of 25° C., the displacement amount of the imaging lens $12_1$ in the optical-axis direction was 4.8 μm without the radiator plate $14_2$. In this regard, the surface temperature of the sensor body $13_1$ was 33.9° C. and the temperature of the imaging lens $12_1$ was 30.9° C. On the other hand, the displacement amount was reduced to 3.6 μm with the radiator plate $14_2$ being present. In this regard, the surface temperature of the sensor body $13_1$ was 30.7° C. and the temperature of the imaging lens $12_1$ was 28.9° C.

Moreover, when the optical sensor 13 (the sensor body $13_1$) was driven under the environmental temperature of 50° C., the displacement amount of the imaging lens $12_1$ in the optical-axis direction was 16.7 μm without the radiator plate $14_2$. In this regard, the surface temperature of the sensor body $13_1$ was 58.9° C. and the temperature of the imaging lens $12_1$ was 55.9° C. On the other hand, the displacement amount was reduced to 15.6 μm with the radiator plate $14_2$ being present. In this regard, the surface temperature of the sensor body $13_1$ was 55.7° C. and the temperature of the imaging lens $12_1$ was 53.9° C.

Thus, by installing the radiator plate $14_2$, the displacement of the imaging lens $12_1$ is suppressed, which can in turn suppress fluctuations in the detected length caused by temperature fluctuations.

As described in detail above, according to the positional change detector 10 of Example 4, the radiator plate $14_2$ releases heat produced by the optical sensor 13 which is one of heat sources increasing the temperature inside the positional change detector 10, to the outside of the detector. Thus, thermal expansion of the casing 14 and the like is suppressed to consequently suppress displacement of a focal point of the imaging optical system 12 (imaging lens $12_1$) and thereby suppress fluctuations in the detected length due to temperature fluctuations. Thereby, positional change of the transfer belt or the like can be measured with high accuracy, and the transfer belt or the like can be driven with high accuracy by use of the measurement result.

Having high detection accuracy and being stable irrespective of temperature fluctuations, the positional change detectors 10 according to Examples 2 to 4 described above can be used as a detection device in a multicolor image forming apparatus used for a digital copier, a printer, a facsimile machine, a multifunctional machine having these capabilities, or the like, the detection device being, for example, one configured to detect the drive amount or driving velocity of a conveyer belt or an intermediate transfer belt or one configured to detect the feeding amount or velocity of a recording medium. Since the transfer belt or the like can thus be driven and controlled with high accuracy, high-quality images can be printed with low cost.

Further, the positional change detectors 10 according to Examples 2 to 4 described above can accurately measure the positional change amount or the traveling velocity of a measured object without marking it and therefore touching it. Thus, the positional change detectors 10 can be used to measure the positional change amount or velocity of not only a transfer belt or the like of a multicolor image forming apparatus, but also wide-range measured objects, in which a speckle pattern is obtained by coherent light.

Note that the configuration of the positional change detectors 10 according to Examples 2 to 4 above, or particularly the optimization of the df/dT value in Example 2, can be applied to a positional change detector 10 having different size, structure, and the like to enable minimization of fluctuations in the detected length due to temperature fluctuations.

Moreover, although a detected length, which is a quantity related to positional change (position), is measured in Examples 2 to 4 above, velocity can also be obtained by differentiating the positional change with respect to a time, one time, and acceleration can be obtained by differentiating the positional change with respect to a time, two times. In such a case, fluctuations in velocity and acceleration in a minute period of time can also be obtained by appropriately setting a frame rate for acquiring speckle images.

Example 5

Scanning means used in Patent Document 1 includes generally a lens barrel to which an imaging lens is attached, a two-dimensional image sensor (such as a CMOS sensor) capable of acquiring two-dimensional images, and the like, and these members are set in position inside a case and fixed to the case.

Being generally made of a resin material, the case inside an image forming apparatus may thermally expand toward an intermediate transfer belt in a direction of an optical axis of the imaging lens due to heat produced by a heat producing member during image formation operation. Then, the lens barrel retained inside the case by use of screws or the like is also displaced together with the case toward the intermediate transfer belt in the direction of the optical axis of the imaging lens. This leads to a detection error of, for example, several tens of micrometers in a traveled distance of the intermediate transfer belt in a direction perpendicular to the optical direction (such a traveled distance is called a detected length hereinbelow).

The error in the detected length hinders accurate detection of the traveled distance of a mobile object such as an intermediate transfer belt, and therefore hinders accurate detection of the traveling velocity of the intermediate transfer belt.

In the configuration of a velocity detection device described in Patent Document 3, a speckle pattern undergoes very little shift in a planar direction of an area sensor even if a moving member (mobile object) is shifted in a direction perpendicular to a moving plane. Thus, a detection error is less likely to occur. However, Patent Document 3 does not describe any configuration of the velocity detection device for suppressing a change in a detected value due to a temperature change in the device.

Thus, Example 5 aims to provide a detection device and an image forming apparatus capable of accurately detecting the traveled distance of a mobile object such as an intermediate transfer belt by suppressing displacement of a lens barrel to which an imaging lens is attached, which displacement is caused by thermal expansion due to an increase in the ambient temperature.

(Configuration of the Detection Device 20)

Figure 19:
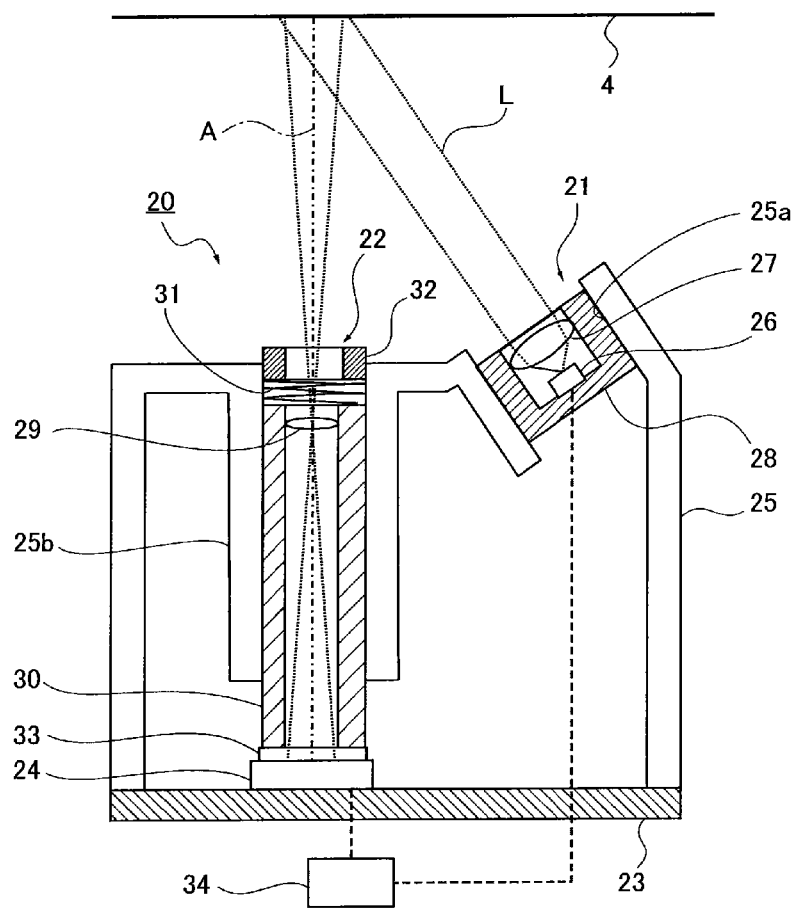
FIG. 19 is a schematic diagram showing the configuration of a detection device according to Example 5.

As shown in FIG. 19, a detection device 20 has an illuminating optical system portion 21, an imaging optical system portion 22, a CMOS sensor 24 as a two-dimensional image sensor mounted on a substrate 23, and a case 25 retaining these members. The case 25 is made of a resin material such as, e.g., a polycarbonate resin or an ABS resin.

The illuminating optical system portion 21 has a laser light source 26 such as a laser diode (LD) and a collimating lens 27 configured to collimate laser light (light beam) emitted from the laser light source 26 into substantially parallel light. These members are retained inside a retaining frame 28 made of metal, and is press-fit into an attachment hole 25a of the case 25 at a predetermined angle relative to a surface of the intermediate transfer belt 4.

The imaging optical system portion 22 has a tubular lens barrel 30 retaining an imaging lens 29 thereinside, and the lens barrel 30 is inserted into a lens-barrel retaining portion 25b formed inside the case 25 integrally therewith, such that the lens barrel 30 is slidable relative to an inner surface of the lens-barrel retaining portion 25b in a direction of an optical axis. The lens barrel 30 is made of a metal material, such as aluminum or SUS, whose coefficient of linear expansion is smaller than that of a resin material. The direction along the optical axis A of the imaging lens 29 coincides with an area on the surface of the intermediate transfer belt 4 irradiated with laser light L emitted from the laser light source 26.

An upper surface of the lens barrel 30 is located inside the lens-barrel retaining portion 25b, and a coil spring 31 as an elastic member is placed on an end surface of the lens barrel 30 on its upper-surface side, and is pressed by an annular falling-off prevention member 32 made of metal press-fit into an upper portion of the lens-barrel retaining portion 25b. An end surface of the lens barrel 30 on its lower-surface side is in contact with a covering glass plate 33 on a surface of the CMOS sensor 24 located on the optical axis A.

Figure 20A:
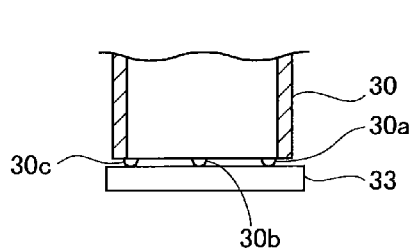
FIG. 20A is a side view showing an area including a lower surface of a lens barrel of the detection device according to Example 5.
Figure 20B:
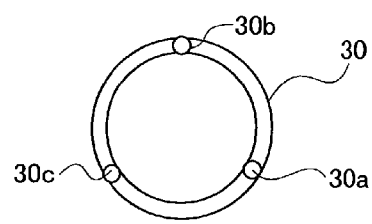
FIG. 20B is a diagram showing the lower surface of the lens barrel of the detection device according to Example 5.

Although the lower surface of the lens barrel 30 may be in contact with the entire outer circumferential portion of the covering glass plate 33, it may alternatively be in contact with the covering glass plate 33 at its three hemispherical protrusions 30a, 30b, and 30c formed on the lower surface of the lens barrel 30 at equal intervals, as shown in FIGS. 20A and 20B. The protrusion 30a, 30b, 30c is not limited to having the hemispherical shape, but for example, may have a flat surface at its tip end.

Next, a brief description is given of operation of the detection device 20 described above in detecting the traveling velocity of or velocity fluctuations in the intermediate transfer belt 4.

The laser light L emitted from the laser light source 26 and collimated into substantially parallel light by the collimating lens 27 is applied obliquely to the intermediate transfer belt 4 in motion. Then, an image of the irradiated surface on the intermediate transfer belt 4 is captured by the imaging lens 29, and the optical image thus captured is formed on a light-receiving surface of the CMOS sensor 24.

Since the surface of a belt main body of the intermediate transfer belt 4 having minute asperities is covered with a light transmitting member, the most part of the laser light L entering the surface of the intermediate transfer belt 4 passes through the light transmitting member and is scattered by the surface of the belt main body. Scattering rays interfere with one another, and a speckle image pattern based on the asperities of the surface of the belt main body is formed. The imaging lens 29 images this speckle image pattern, and the CMOS sensor 24 outputs image data according to the speckle image pattern thus imaged. Meanwhile, a controller 34 commands the laser light source 26 to emit the laser light L and takes in the image data (speckle image pattern) from the CMOS sensor 24 at certain time intervals.

Then, a known method is used to compute cross-correlation functions of two speckle image patterns temporally close to each other, and based on peak positions of the cross-correlation functions, a traveled distance of the belt surface of the intermediate transfer belt 4 is calculated.

Then, based on the traveled distance of the belt surface thus calculated, the controller 34 calculates the traveling velocity of the intermediate transfer belt 4. Then, a printer control device (not shown) takes in information on the traveling velocity of the intermediate transfer belt 4 thus calculated, and compares the traveling velocity with a preset traveling velocity. If there is a velocity difference, the printer control device outputs a correction signal to a drive motor (not shown) of driving rollers 11 to correct the traveling velocity of the intermediate transfer belt 4 into a normal velocity.

It is also possible to find fluctuations in the velocity of the intermediate transfer belt 4 in a minute period of time by appropriately selecting the frame frequency for acquiring the image data (speckle image pattern).

The internal temperature of the image forming apparatus is increased by e.g., heat produced by heat producing members during image forming operation of the image forming apparatus. For this reason, the case 25 and the lens barrel 30 of the detection device 20 which is located inside the image forming apparatus are easily displaced, due to thermal expansion, toward the intermediate transfer belt 4 in the direction along the optical axis A of the imaging lens 29.

Nonetheless, since the lens barrel 30 is made of a metal material such as aluminum or SUS having a small coefficient of linear expansion in Example 5, displacement due to thermal expansion toward the intermediate transfer belt 4 in the direction along the optical axis A of the imaging lens 29 can be reduced.

Further, the lens barrel 30 is inserted into the tubular lens-barrel retaining portion 25b such that the lens barrel 30 is slidable relative to the inner surface of the tubular lens-barrel retaining portion 25b in the direction along the optical axis A. Thus, displacement of the case 25 due to thermal expansion is absorbed by the sliding of the lens barrel 30 relative to the lens-barrel retaining portion 25b and is thereby prevented from being transmitted to the lens barrel 30 side.

Further, inside the tubular lens-barrel retaining portion 25b, the lens barrel 30 is constantly pressed against the CMOS sensor 24 by the coil spring 31 from above. Thus, the position of the lens barrel 30 can be stabilized, allowing a stable distance to be maintained between the imaging lens 29 and the CMOS sensor 24.

Moreover, the CMOS sensor 24 itself produces heat when in operation. For this reason, heat produced by the CMOS sensor 24 is transmitted to the lens barrel 30 through the covering glass plate 33. To reduce displacement of the lens barrel 30 due to thermal expansion, it is desirable to suppress transmission of heat produced by the CMOS sensor 24.

To this end, in Example 5, as shown in FIGS. 20A and 20B, the area of contact between the lens barrel 30 and the covering glass plate 33 is decreased by bringing the lens barrel 30 into contact with the covering glass plate 33 only at the three hemispherical protrusions 30a, 30b, and 30c formed on the lower surface of the lens barrel 30. This can suppress transmission of heat produced by the CMOS sensor 24 to the lens barrel 30 through the covering glass plate 33.

Since displacement of the lens barrel 30 due to thermal expansion toward the intermediate transfer belt 4 in the direction of the optical axis A can thus be suppressed, displacement of the imaging lens 29 inside the lens barrel 30 can also be suppressed. This contributes to a reduction in an error in the detected length. Hence, even when a temperature around the detection device 20 increases, the traveling velocity of the intermediate transfer belt 4 or fluctuations in the velocity thereof can be accurately detected.

Example 6

Like Example 5, Example 6 aims to provide a detection device and an image forming apparatus capable of accurately detecting the traveled distance of a mobile object, such as an intermediate transfer belt, by suppressing displacement of a lens barrel having an imaging lens attached thereto due to thermal expansion caused by an increase in the ambient temperature.

Figure 21:
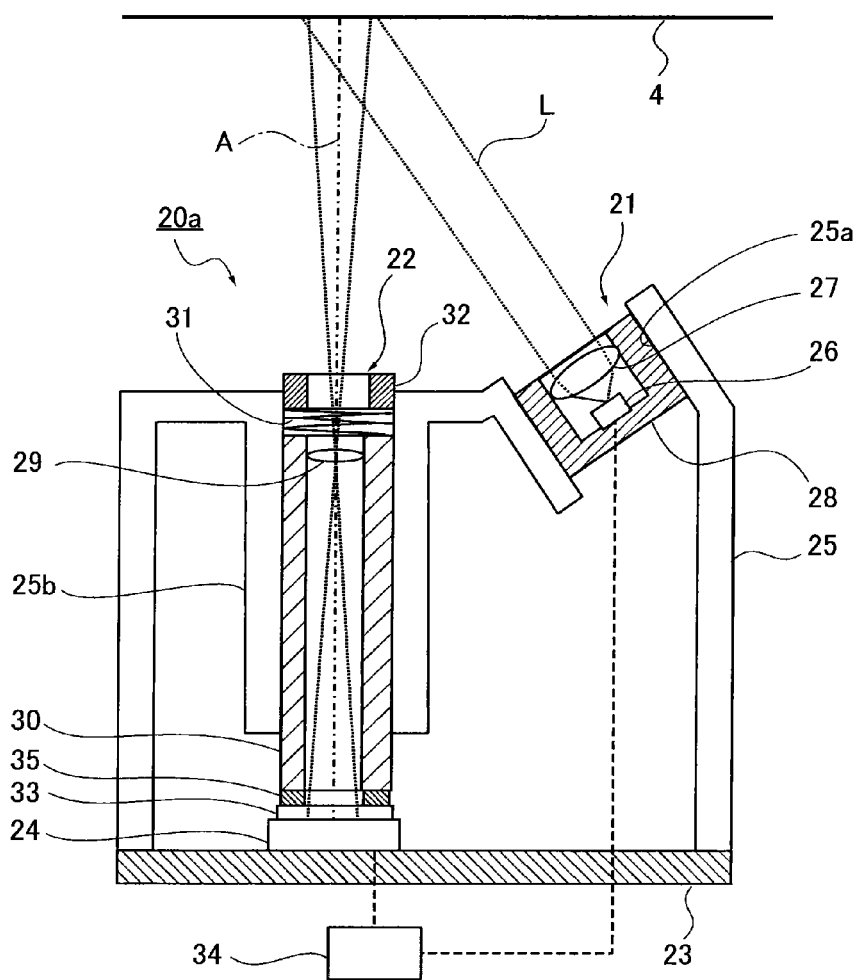
FIG. 21 is a schematic diagram showing the configuration of a detection device according to Example 6.

FIG. 21 is a schematic sectional view showing the detection device according to Example 6. Note that elements in FIG. 21 having the same functions as those of the detection device of Example 5 shown in FIG. 19 are denoted by the same reference numerals, and are not described again here.

As shown in FIG. 21, a detection device 20a of Example 6 has a configuration in which a buffer member 35 having low thermal conductivity is placed between the lower surface of the lens barrel 30 and an outer circumferential portion of the covering glass plate 33 on the CMOS sensor 24. For example, a buffer member being made of a POM (polyacetal) resin and having a thickness of, e.g., about 1 mm can be used as the buffer member 35. Other configuration is similar to that of the detection device of Example 5 shown in FIG. 19.

The buffer member 35 having low thermal conductivity and placed between the lower surface of the lens barrel 30 and the CMOS sensor 24 (the covering glass plate 33) allows more favorable suppression of transmission of heat produced by the CMOS sensor 24 to the lens barrel 30 through the covering glass plate 33. Displacement of the imaging lens 29 inside the lens barrel 30 can also be suppressed. Thereby, an error in the detected length can be further reduced.

Example 7

Like Examples 5 and 6, Example 7 aims to provide a detection device and an image forming apparatus capable of accurately detecting the traveled distance of a mobile object, such as an intermediate transfer belt, by suppressing displacement of a lens barrel having an imaging lens attached thereto due to thermal expansion caused by an increase in the ambient temperature.

Figure 22:
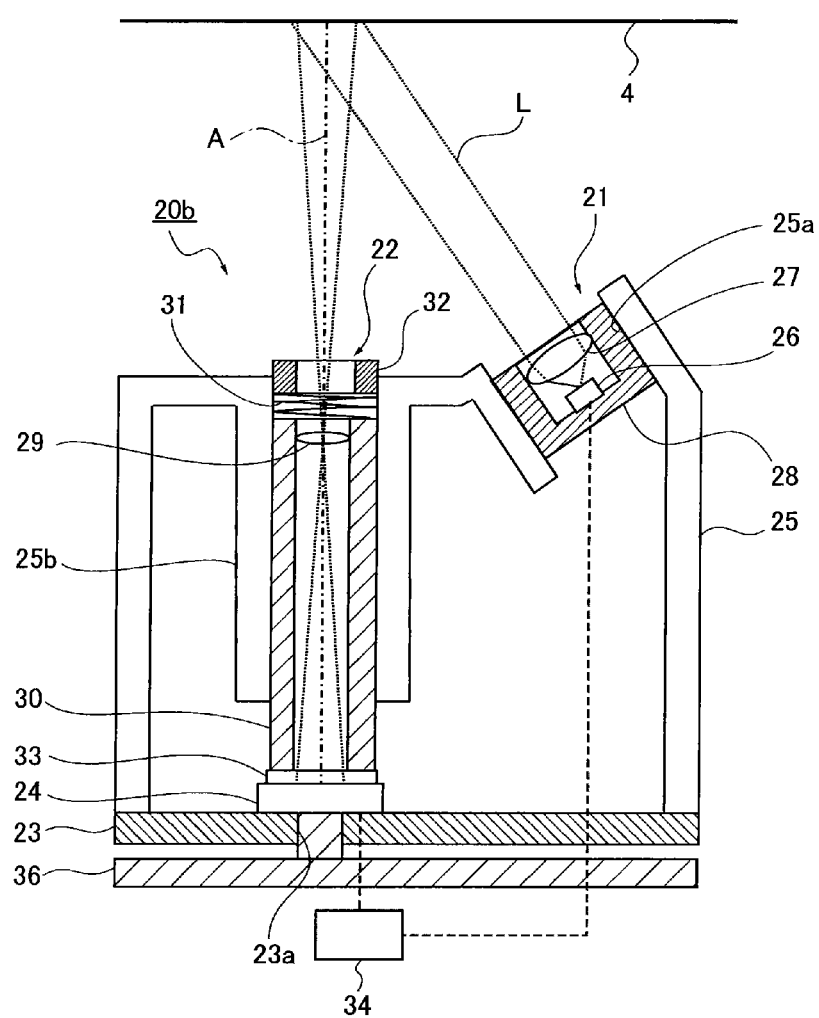
FIG. 22 is a schematic diagram showing the configuration of a detection device according to Example 7.

FIG. 22 is a schematic sectional view showing the detection device according to Example 7. Note that elements in FIG. 22 having the same functions as those of the detection device of Example 5 shown in FIG. 19 are denoted by the same reference numerals, and are not described again here.

As shown in FIG. 22, a detection device 20b of Example 7 has a through-hole 23a in the substrate 23, and a radiator member 36 placed outside the substrate 23 is connected to the back surface of the CMOS sensor 24 through the through-hole 23a. Other configuration is similar to that of the detection device of Example 5 shown in FIG. 19.

The connection of the radiator member 36 to the back surface of the CMOS sensor 24 through the through-hole 23a allows more favorable suppression of transmission of heat produced by the CMOS sensor 24 to the lens barrel 30 through the covering glass plate 33. Displacement of the imaging lens 29 inside the lens barrel 30 can also be suppressed. Thereby, an error in the detected length can be further reduced.

For example, when the CMOS sensor 24 was driven under a room temperature of 25° C., the amount of displacement of the imaging lens 29 was 4.8 µm without the radiator plate 36. In this regard, the surface temperature of the CMOS sensor 24 was 33.9° C. and the temperature of the imaging lens 29 was 30.9° C.

On the other hand, the amount of displacement of the imaging lens 29 was reduced to 3.6 µm with the radiator plate 36 being present. In this regard, the surface temperature of the CMOS sensor 24 was 30.7° C. and the temperature of the imaging lens 29 was 28.9° C.

Moreover, when the CMOS sensor 24 was driven under a room temperature of 50° C., the amount of displacement of the imaging lens 29 was 16.7 µm without the radiator plate 36. In this regard, the surface temperature of the CMOS sensor 24 was 58.9° C. and the temperature of the imaging lens 29 was 55.9° C.

On the other hand, the amount of displacement was reduced to 15.6 µm with the radiator plate 36 being present. In this regard, the surface temperature of the CMOS sensor 24 was 55.7° C. and the temperature of the imaging lens 29 was 53.9° C.

Although the case 25 is made of a resin material in Examples 5 to 7 described above, the case 25 is not being limited thereto, and may be made of a metal material such as aluminum or SUS having a smaller coefficient of linear expansion than a resin material.

Moreover, although the detection device 20 is configured to detect information on traveling of the intermediate transfer belt 4 in Examples 5 to 7 described above, the detection device 20 can also be employed similarly as a detection device configured to detect information on traveling of an endless conveyer belt configured to convey a recording medium to multiple image carriers on which toner images of respective colors are formed, while sucking the recording medium onto its surface.

What is claimed is:

1. A positional change measurement device comprising:
   a light source;
   an illuminating optical system configured to guide light from the light source to a measured surface;
   an imaging optical system including at least a first lens group and a second lens group;
   an image pickup device configured to acquire a speckle pattern by receiving reflection light from the measured surface via the imaging optical system; and
   a group-interspace adjustment mechanism configured to adjust an interspace between the first lens group and the second lens group according to an amount of fluctuations in a focal length of each of the first lens group and the second lens group, caused by the temperature fluctuations, wherein
   positional change of the measured surface is measured based on a result of cross-correlation computation performed on a plurality of speckle patterns acquired at predetermined time intervals.

2. The positional change measurement device according to claim 1, wherein
the computing unit compensates for mechanical fluctuations in the detected length due to change in positions of the light source and the illuminating optical system, by using optical fluctuations in the detected length due to change in a focal length of the imaging optical system.

3. The positional change measurement device according to claim 2, further comprising:
a support member configured to retain the light source, the illuminating optical system, the imaging optical system, and the image pickup device; and
an imaging-optical-system retaining member configured to retain the imaging optical system, wherein
the support member brings the imaging-optical-system retaining member into contact with the image pickup device and presses the imaging-optical-system retaining member in a direction along an optical axis of the imaging optical system.

4. The positional change measurement device according to claim 1, further comprising:
a lens barrel configured to retain the imaging optical system; and
a lens-barrel retaining member configured to retain the lens barrel, wherein
the lens barrel and the lens-barrel retaining member are different in their amounts of change in a direction of an optical axis of the lens barrel, the change being caused by temperature fluctuations.

5. The positional change measurement device according to claim 4, further comprising a sliding retaining member configured to enable the lens barrel to slide relative to the lens-barrel retaining member.

6. A positional change measurement device, comprising:
a light source;
an illuminating optical system configured to guide light from the light source to a measured surface;
an imaging optical system including at least a first lens group and a second lens group, and
an image pickup device configured to acquire a speckle pattern by receiving reflection light from the measured surface via the imaging optical system,
wherein the imaging optical system has an optical characteristic that changes a focal length in a direction of mitigating mechanical fluctuations in a detected length due to change in positions caused by temperature fluctuations of the light source and the illuminating optical system, and
wherein positional change of the measured surface is measured based on a result of cross-correlation computation performed on a plurality of speckle patterns acquired at predetermined time intervals.

7. An image forming apparatus which forms an image on a surface of a mobile object traveling in a certain direction at a certain velocity, the apparatus comprising
the positional change measurement device according to claim 1, wherein
the positional change measurement device measures at least one of a traveled distance and a traveling velocity of the surface of the mobile object which is a dynamic measure surface.

8. A positional change measurement device comprising:
a light source;
an illuminating optical system configured to guide light from the light source to a measured surface;
an imaging optical system; and
an image pickup device configured to acquire a speckle pattern by receiving reflection light from the measured surface via the imaging optical system, wherein
positional change of the measured surface is measured based on a result of cross-correlation computation performed on a plurality of speckle patterns acquired at predetermined time intervals,
the imaging optical system includes, from a measured-surface side, a first group of a positive power, an aperture stop, and a second group of a positive power,
the aperture stop is provided at a position of an image-side focal plane of the first group and of an object-side focal plane of the second group,
a light-receiving surface of the image pickup device is placed at a Gaussian plane of the measured surface formed by the imaging optical system, and
the positional change measurement device satisfies:
a condition (1) $D/Db=0$,
where Db is a distance between a boiling plane of the measured surface and the Gaussian plane of the measured surface formed by the imaging optical system, and D is an interspace between the Gaussian plane and the light-receiving surface of the image pickup device.

9. The positional change measurement device according to claim 8, wherein
each of the first group and the second group of the imaging optical system is formed by two or more lenses made of different materials, and
irrespective of fluctuations in a measurement environment temperature, the positional change measurement device satisfies:
the condition (1) $D/Db=0$,
where Db is the distance between the boiling plane of the measured surface and the Gaussian plane of the measured surface formed by the imaging optical system, and D is the interspace between the Gaussian plane and the light-receiving surface of the image pickup device.

10. The positional change measurement device according to claim 8, further comprising a group-interspace adjustment mechanism configured to adjust an interspace between the first group and the second group according to an amount of fluctuations in a focal length of each of the first group and the second group constituting the imaging optical system, the fluctuations being caused by fluctuations in a measurement environment temperature.

11. The positional change measurement device according to claim 10, wherein
the group-interspace adjustment mechanism suppresses fluctuations in an average value of magnifications of a plurality of real-image heights in a speckle pattern, the fluctuations being caused by the fluctuations in the measurement environment temperature.

12. The positional change measurement device according to claim 11, wherein
The group-interspace adjustment mechanism has a plurality of lens barrels including at least a first lens barrel configured to retain the first group and a second lens barrel configured to retain the second group, the first lens barrel and the second lens barrel having different coefficients of linear expansion,
one of the first lens barrel and the second lens barrel is fixed at one end to the image pickup device, and
elongation and contraction of the plurality of lens barrels due to the fluctuations in the measurement environment temperature are utilized to suppress the fluctuations in the average value of the magnifications of the plurality of real-image heights in the speckle pattern, the fluctuations being caused by the fluctuations in the measurement environment temperature.

13. The positional change measurement device according to claim 12, wherein
the group-interspace adjustment mechanism has the first lens barrel configured to retain the first group, a third lens barrel slidable relative to the first lens barrel, and the second lens barrel configured to retain the second group,
the first lens barrel and the third lens barrel are fixed at one ends to the image pickup device, and
elongation and contraction of any one of the first lens barrel and the third lens barrel due to the fluctuations in the measurement environment temperature are utilized to minimize the fluctuations in the average value of the magnifications of the plurality of real-image heights in the speckle pattern, the fluctuations being caused by the fluctuations in the measurement environment temperature.

14. The positional change measurement device according to claim 13, wherein
the second lens barrel and the image pickup device do not come into contact with each other irrespective of the fluctuations in the measurement environment temperature.

15. The positional change measurement device according to claim 13, wherein
an endmost surface portion of the second lens barrel located on a first-group side in a direction along an axis of the second lens barrel does not come into contact with a surface of the first lens barrel facing the endmost surface portion, irrespective of the fluctuations in the measurement environment temperature.

16. The positional change measurement device according to claim 15, further comprising a repulsive elastic member located between the first lens barrel and the second lens barrel and configured to exert an elastic force pressing the second lens barrel against the third lens barrel.

17. The positional change measurement device according to claim 16, wherein
the first lens barrel and a housing retaining the first lens barrel respectively have opposite surfaces facing each other in a direction along an axis of the first lens barrel,
the positional change measurement device comprises a compressive elastic member between the opposite surface of the first lens barrel and the opposite surface of the housing,
the repulsive elastic member exerting the elastic force pressing the second lens barrel against the third lens barrel and the compressive elastic member are both spring members,
with the repulsive elastic member expressed as a spring member A and the compressive elastic member expressed as a spring member B, the positional change measurement device satisfies conditions:

$$K1 \cdot n1 - K2 \cdot n2 - M1 \cdot G < 0, \text{ and} \quad (3)$$

$$-K1 \cdot n1 - K2 \cdot n2 - M2 \cdot G - M3 \cdot G < 0, \quad (4)$$

where K1 and n1 are a spring constant and a flexture amount, respectively, of the spring member A, M1 is a mass of the first lens barrel, K2 and n2 are a spring constant and a flexture amount, respectively, of the spring member B, M2 is a mass of the second lens barrel, M3 is a mass of the third lens barrel, and G is a gravitational acceleration, and
the positional change measurement device is located below the measured surface.

18. The positional change measurement device according to claim 16, wherein
the first lens barrel and a housing retaining the first lens barrel have opposite surfaces facing each other in a direction along an axis of the first lens barrel,
the positional change measurement device comprises a compressive elastic member between the opposite surface of the first lens barrel and the opposite surface of the housing,
the repulsive elastic member exerting the elastic force pressing the second lens barrel against the third lens barrel and the compressive elastic member are both spring members,
with the repulsive elastic member expressed as a spring member A and the compressive elastic member expressed as a spring member B, the positional change measurement device satisfies conditions:

$$-K1 \cdot n1 + K2 \cdot n2 - M1 \cdot G > 0, \text{ and} \quad (5)$$

$$K1 \cdot n1 - M3 \cdot G > 0, \quad (6)$$

where K1 and n1 are a spring constant and a flexture amount, respectively, of the spring member A, M1 is a mass of the first lens barrel, K2 and n2 are a spring constant and a flexture amount, respectively, of the spring member B, M3 is a mass of the third lens barrel, and G is a gravitational acceleration, and
the positional change measurement device is located above the measured surface.

19. An image forming apparatus which forms an image on a surface of a mobile object traveling in a certain direction, the apparatus comprising
the positional change measurement device according to claim 8, wherein
the positional change measurement device measures at least one of a traveled distance and a traveling velocity of the surface of the mobile object which is a dynamic measure surface.

* * * * *